United States Patent
Pareek et al.

(10) Patent No.: US 9,442,995 B2
(45) Date of Patent: Sep. 13, 2016

(54) LOG-BASE DATA REPLICATION FROM A SOURCE DATABASE TO A TARGET DATABASE

(71) Applicant: ORACLE INTERNATIONAL CORPORATION, Redwood Shores, CA (US)

(72) Inventors: Alok Pareek, Hillsborough, CA (US); Mahadevan Lakshminarayanan, Chennai (IN); Avinash Dubey, Madhya Pradesh (IN); Scott Corbin, Spooner, WI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/956,175

(22) Filed: Jul. 31, 2013

(65) Prior Publication Data

US 2013/0318044 A1    Nov. 28, 2013

Related U.S. Application Data

(63) Continuation of application No. 13/077,760, filed on Mar. 31, 2011, now Pat. No. 8,510,270.

(60) Provisional application No. 61/368,141, filed on Jul. 27, 2010.

(51) Int. Cl.
*G06F 7/00* (2006.01)
*G06F 17/30* (2006.01)
(Continued)

(52) U.S. Cl.
CPC ... *G06F 17/30575* (2013.01); *G06F 17/30067* (2013.01); *G06F 17/30581* (2013.01);
(Continued)

(58) Field of Classification Search
CPC .................. G06F 17/30575; G06F 17/30657; G06F 17/30581; G06F 17/30067
See application file for complete search history.

(56) References Cited

U.S. PATENT DOCUMENTS

| 6,687,848 B1 | 2/2004 | Najmi |
| 6,753,889 B1 | 6/2004 | Najmi |

(Continued)

FOREIGN PATENT DOCUMENTS

| CN | 101615199 | 12/2009 |
| CN | 101719165 | 6/2010 |

(Continued)

OTHER PUBLICATIONS

Fred Louis, "Oracle Golden Gate: Architecture for Real-Time Replication" Jan. 2010, 69 pages.*

(Continued)

*Primary Examiner* — Loan T Nguyen
(74) *Attorney, Agent, or Firm* — Tucker Ellis LLP

(57) ABSTRACT

A system and method for transferring data between different types of systems, and in particular uses log-based replication to transfer data between different types of systems. In accordance with an embodiment, the system can be used to perform a one-time or initial copy of the MySQL data from a source database system to a target database system, and/or to replicate the on-going transactions captured from a MySQL database's binary log into one or additional non-MySQL database(s) on a continuous basis, such that the two systems are synchronized for transactions of interest. In accordance with an embodiment, full or partial data changes can be extracted from the MySQL binary log, optionally transformed, skipped or augmented, output or written to a file, and then applied at any of one or more target systems (e.g. another MySQL database, or a non-MySQL database), thereby synchronizing the source and target systems.

20 Claims, 14 Drawing Sheets

(51) Int. Cl.
*G06F 11/14* (2006.01)
*G06F 11/20* (2006.01)

(52) U.S. Cl.
CPC ..... *G06F17/30657* (2013.01); *G06F 11/1471* (2013.01); *G06F 11/2094* (2013.01); *G06F 11/2097* (2013.01)

(56) References Cited

U.S. PATENT DOCUMENTS

| | | | |
|---|---|---|---|
| 6,877,023 | B1 | 4/2005 | Maffeis et al. |
| 7,031,987 | B2 | 4/2006 | Mukkamalla et al. |
| 7,039,773 | B2 | 5/2006 | Hu et al. |
| 7,254,586 | B2 | 8/2007 | Chen |
| 7,299,230 | B2 | 11/2007 | Liou et al. |
| 7,571,173 | B2 | 8/2009 | Yang et al. |
| 7,702,698 | B1 | 4/2010 | Chakravarthy |
| 7,730,107 | B1 | 6/2010 | Shultz |
| 7,873,635 | B2 | 1/2011 | Wang |
| 8,161,468 | B2 | 4/2012 | Todd |
| 8,224,834 | B2 | 7/2012 | Akaboshi |
| 8,402,358 | B2 | 3/2013 | Knauft |
| 8,666,939 | B2 * | 3/2014 | O'Krafka et al. ............ 707/615 |
| 2002/0169842 | A1 | 11/2002 | Christensen et al. |
| 2002/0174340 | A1 | 11/2002 | Dick et al. |
| 2004/0148585 | A1 | 7/2004 | Sengodan |
| 2004/0254919 | A1 | 12/2004 | Giuseppini |
| 2005/0102264 | A1 | 5/2005 | Nason |
| 2005/0253739 | A1 | 11/2005 | Hu |
| 2006/0041540 | A1 | 2/2006 | Shannon |
| 2006/0212356 | A1 | 9/2006 | Lambert et al. |
| 2007/0044069 | A1 | 2/2007 | Doucette |
| 2007/0226263 | A1 | 9/2007 | Liou |
| 2007/0288458 | A1 | 12/2007 | Kacmarcik |
| 2007/0299885 | A1 | 12/2007 | Pareek |
| 2008/0077601 | A1 | 3/2008 | Liou |
| 2009/0106327 | A1 | 4/2009 | Dilman et al. |
| 2009/0313311 | A1 | 12/2009 | Hoffmann et al. |
| 2010/0042583 | A1 | 2/2010 | Gervais |
| 2010/0191884 | A1 * | 7/2010 | Holenstein et al. .......... 710/200 |
| 2010/0205123 | A1 | 8/2010 | Sculley |
| 2010/0274788 | A1 | 10/2010 | Coker |
| 2011/0029681 | A1 | 2/2011 | Lee et al. |
| 2011/0179011 | A1 | 7/2011 | Cardno et al. |
| 2011/0229681 | A1 | 9/2011 | Sakamoto |
| 2011/0307524 | A1 | 12/2011 | Aitken |
| 2012/0023116 | A1 | 1/2012 | Wilkes et al. |
| 2012/0030165 | A1 | 2/2012 | Guirguis et al. |
| 2012/0030172 | A1 | 2/2012 | Pareek et al. |
| 2012/0137276 | A1 | 5/2012 | Todd |
| 2012/0295716 | A1 | 11/2012 | Lee et al. |

FOREIGN PATENT DOCUMENTS

| | | |
|---|---|---|
| JP | 2000-082070 A | 3/2000 |
| JP | 2004-341926 A | 12/2004 |
| JP | 2005293323 | 10/2005 |
| JP | 2007-114817 A | 5/2007 |
| WO | 2007134250 A2 | 11/2007 |

OTHER PUBLICATIONS

Oracle International Corporation, Oracle GoldenGate Administrative Guide, Version 10.4, Oct. 2009, 59 pages.
Unknown Author, MySQL 5.0 Reference Manual Archived version from Apr. 1, 2010, Jan. 4, 2010, 3 pages.
Soorma, GoldenGate Tutorial 1—Concepts and Architecture, Feb. 18, 2010, 4 pages.
International Searching Authority, International Search Report and Written Opinion for PCT International Patent Application No. PCT/US2011/036508, Feb. 18, 2013, 10 pages.
Louis, Oracle GoldenGate: Architecture for Real-Time Replication, Jan. 2010, 69 pages.
Unknown Author, Oracle GoldenGate, Oracle Data Sheet, Sep. 2009, 4 pages.
Blyth, Oracle GoldenGate—An Overview, Jul. 2010, 58 pages.
Unknown Author, Oracle Technology Overview, Jun. 2010, 30 pages.
Guirguis, et al., BronzeGate: Real-Time Transactional Data Obfuscation for GoldenGate, 2010, Proceeding EDBT '10, Proceedings of the 13th International Conference on Extending Database Technology, pp. 645-650.
Unknown Author, Oracle GoldenGate Administration Guide Version 10.4, Oct. 2009, pp. 13-16, 333-337, Oracle Corporation Retrieved on Feb. 17, 2015, from <URL: https://docs.oracle.com/cd/E15881_01/doc.104/gg_wux_admin_v104.pdf>.
State Intellectual Property Office of the People's Republic of China, Search Report for Chinese Patent Application No. 201180036429.0, Office Action dated Sep. 1, 2015, 2 pages.
Katsumi Kumakura, "Development of Distributed Database by Way of Replication", SQL Server magazine, Japan, Shoeisha Co.,Ltd., Feb. 15, 2004, No. 13, pp. 58-66. Partial Translation—English translation of p. 60 only.
State Intellectual Property Office of the People's Republic of China, Search Report for Chinese Patent Application No. 201180036429.0, Office Action Dated Apr. 1, 2016, 2 Pages.

* cited by examiner

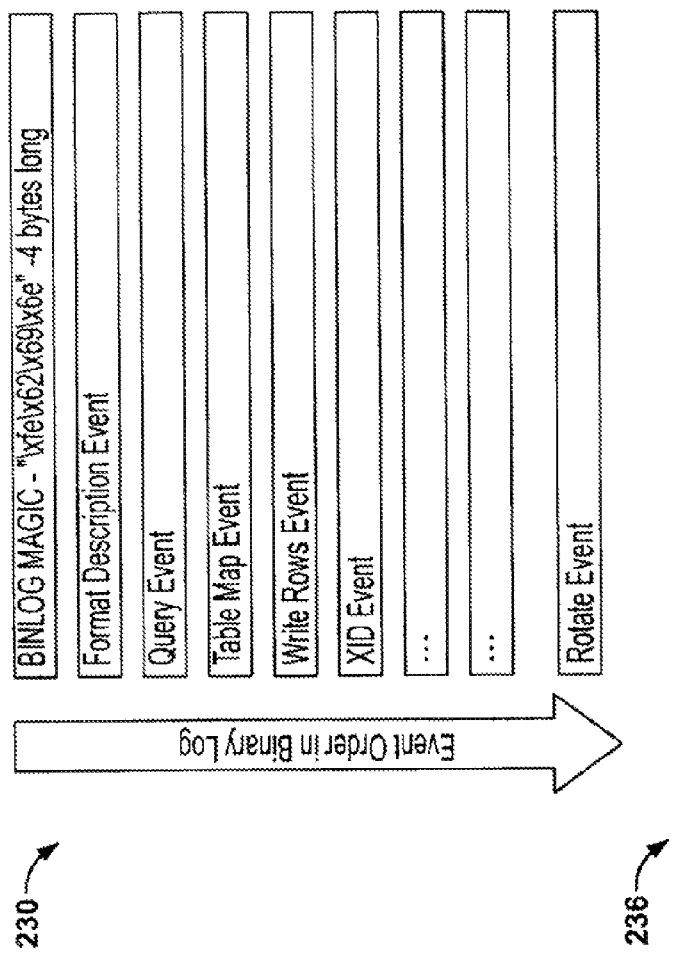

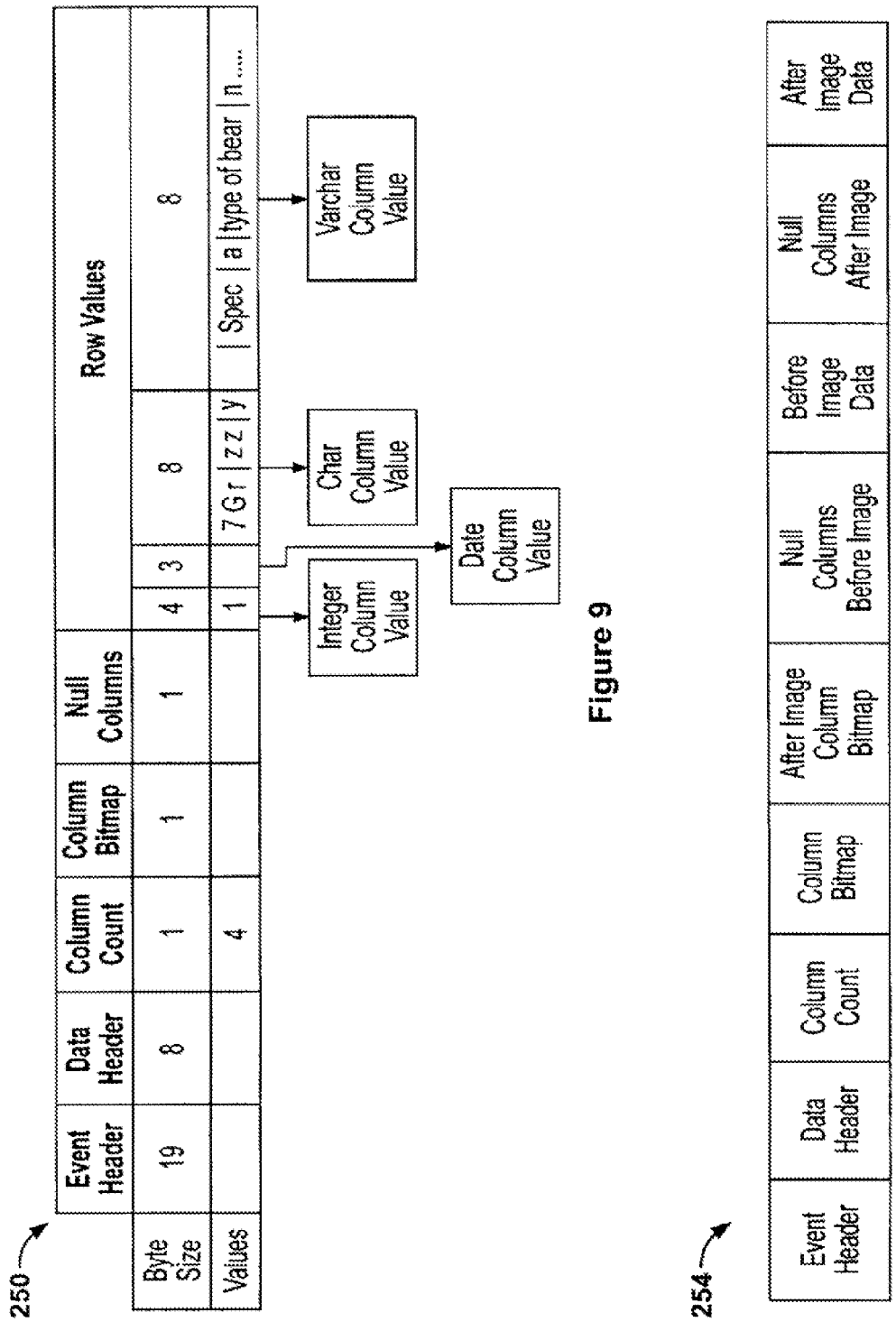

LOG-BASE DATA REPLICATION FROM A SOURCE DATABASE TO A TARGET DATABASE

CLAIM OF PRIORITY

This application is a continuation of U.S. patent application Ser. No. 13/077,760, filed Mar. 31, 2011, entitled "MYSQL DATABASE HETEROGENEOUS LOG BASED REPLICATION", now U.S. Pat. No. 8,510,270, issued on Aug. 13, 2013, which claims the benefit of priority to U.S. Provisional Patent Application No. 61/368,141, titled "HETEROGENEOUS LOG BASED REPLICATION FROM DATABASES SUCH AS MYSQL DATABASES", filed Jul. 27, 2010; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to transferring data between different types of systems, and is particularly related to a system and method that uses log based replication to transfer data between a MYSQL database or system, and another type of database or system.

BACKGROUND

Database products such as the MySQL open source database are used by increasing numbers of organizations worldwide. With an estimated fifty thousand downloads per day, the MySQL database is a popular choice for database developers, administrators (DBAs), and IT managers who want a high-performance database that is reliable, affordable, and easy to use. For some organizations, such databases can become major production environments, and are used to run applications that are core to business operations. As their business grows, so does the need for complex data management. Many of these organizations would like to migrate data from, e.g. their MySQL database, to other commercial databases such as Oracle/DB2/SqlServer, for scalability reasons.

In addition to data migrations, some organizations who use MySQL as their original database may also want to integrate their data with other operational systems and databases. An example may be integration with real time data warehousing systems or other financial applications that runs on different database systems. Such organizations often require a solution that provides heterogeneous replication with low latency for zero downtime migrations.

It is also sometimes the case that an organization would prefer not to burden a production server for frequent reporting queries, since a great number of read-only queries for reporting might slow down the performance of production server. Some organizations may prefer to offload the report-related query processing to another, perhaps lesser-performing, non-production database. For example, some organizations may want to use a first type of database server as their reporting server, with, e.g. MySQL running either in Linux or Windows OS; and a second type of database server, e.g. Oracle running as a high-performance production server.

To enable integration of data persisted in a MySQL database with other non-MySQL systems, custom programs or software components such as ETL/EAI/EII (via a gateway or additional products) can be used. A problem with these technologies is that they are inefficient at processing non-bulk data (ETL), require application modification to publish the data from the application (EAI), or require application access to the MySQL system and the non-MySQL systems and integrate the data as needed. At high volumes, it is computationally taxing to run ETL continuously to integrate the changed data, EAI integration requires modification/access to the application thereby affecting application response times, and EII is slow since it involves access to multiple systems over different (remote) networks.

Accordingly, to date there is no log-based change data capture (CDC) program to perform logical replication of, e.g. MySQL transactional data from a MySQL database to a non-MySQL database, other than periodic (nightly) ETL, EAI, or EII ways of dealing with such integration/synchronization. These are the general areas that embodiments of the invention are intended to address.

SUMMARY

Described herein is a system and method for transferring data between different types of systems, and in particular uses log-based replication to transfer data between, e.g. a MySQL database or system, and another type of database or system. In accordance with an embodiment, the system can be used to perform a one-time or initial copy of the MySQL data from a source database system to a target database system, and/or to replicate the on-going transactions captured from a MySQL database's binary log into one or additional non-MySQL database(s) on a continuous basis, such that the two systems are synchronized for transactions of interest. In accordance with an embodiment, full or partial data changes can be extracted from the MySQL binary log, optionally transformed, skipped or augmented, output or written to a file (which in accordance with an embodiment can be implemented as a trail file, or an Oracle GoldenGate trail file), and then applied at any of one or more target systems (e.g. another MySQL database, or a non-MySQL database), thereby synchronizing the source and target systems.

BRIEF DESCRIPTION OF THE FIGURES

FIG. 5 illustrates the event order in a MySQL binary log, in accordance with an embodiment.

FIG. 6 illustrates an example of the event header structure, in accordance with an embodiment.

FIG. 9 illustrates an example of a write rows event structure, in accordance with an embodiment.

FIG. 10 illustrates an example of an update rows event structure, in accordance with an embodiment.

DETAILED DESCRIPTION

Figure 1:
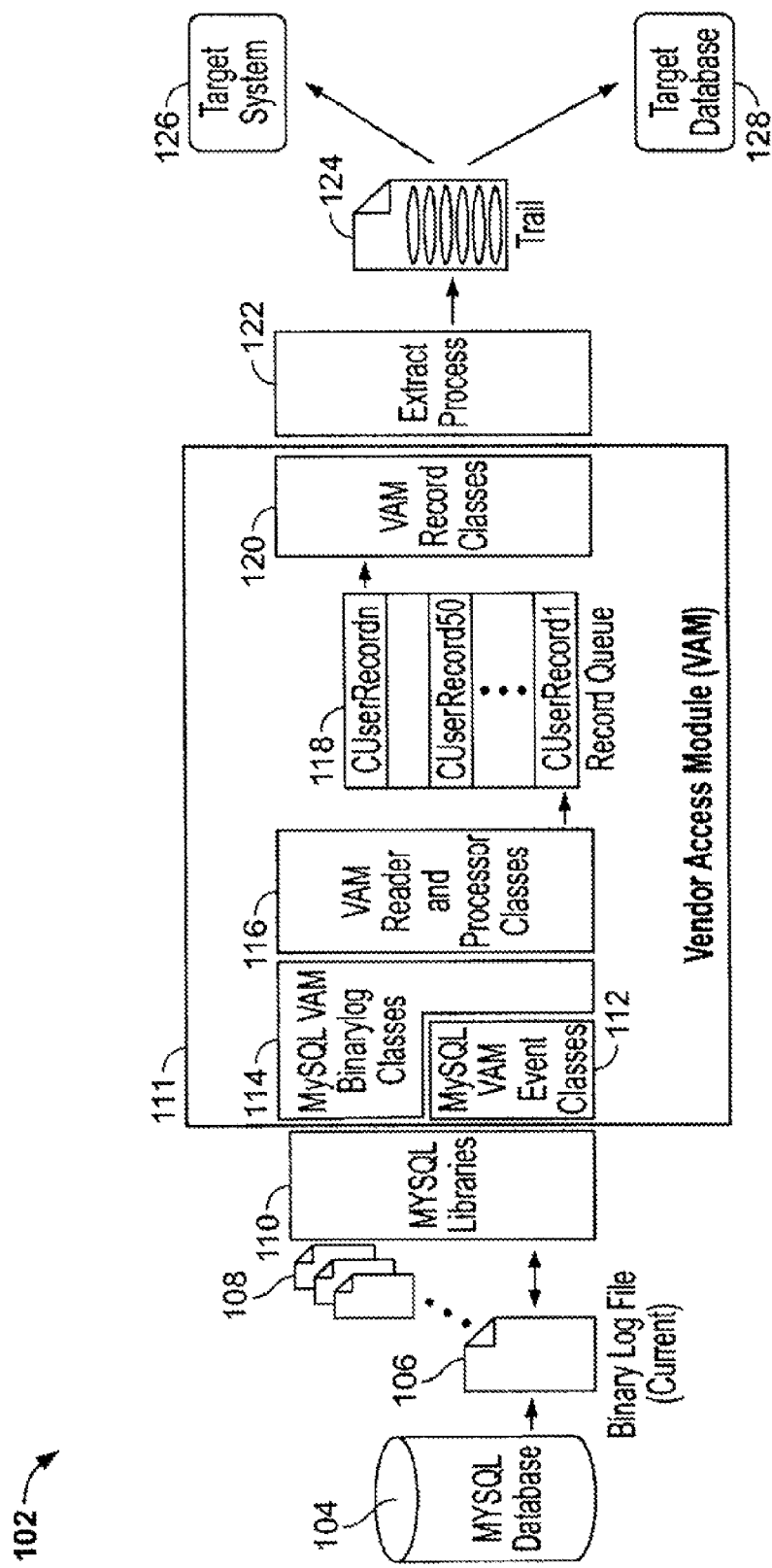
FIG. 1 is an illustration of the overall architecture of a system for heterogeneous log based replication, in accordance with an embodiment.

Described herein is a system and method for transferring data between different types of systems, and in particular uses log-based replication to transfer data between, e.g. a MySQL database or system, and another type of database or system. In accordance with an embodiment, the system can be used to perform a one-time or initial copy of the MySQL data from a source database system to a target database system, and/or to replicate the on-going transactions captured from a MySQL database's binary log into one or additional non-MySQL database(s) on a continuous basis, such that the two systems are synchronized for transactions of interest. In accordance with an embodiment, full or partial data changes can be extracted from the MySQL binary log, optionally transformed, skipped or augmented, output or written to a file (which in accordance with an embodiment can be implemented as a trail file, or an Oracle GoldenGate trail file), and then applied at any of one or more target systems (e.g. another MySQL database, or a non-MySQL database), thereby synchronizing the source and target systems. Advantages of various embodiments of the invention include that:

1. The log-based replication allows for very low latency for transactional replication between the MySQL and the non-MySQL database systems. The general expectation since the time the transaction committed into the MySQL system and the replication to the non-MySQL system is a few seconds or less.

2. The amount of overhead on the MySQL system compared to prior methods is significantly lower, since changes are captured from the log and not the data pages in the MySQL system. The number of bytes transferred over the network is also significantly lower.

3. Application tables are not queried via SQL or another programming language embedding SQL (or SQL like languages), thereby making the replication non-invasive.

4. The system does not require the use of a third party gateway product, and allows guaranteed delivery of transactions in case of network, or system failures, and even for most failures affecting the entire data site.

5. Operational reporting applications can be used to obtain data from the non-MySQL database on a real-time basis without accessing the MySQL database.

6. The system allows for near zero downtime migration of applications running on a MySQL database to a non-MySQL database, and also allows for transactions from a MySQL database to be consumed by a database machine for near real time (or active) data warehousing.

7. The system enables log-based change data capture (CDC), and allows MySQL-based organizations who may seek to scale to another system, but cannot accept application outages, to maintain their two systems in synchrony, conduct thorough testing, and then eventually migrate from their MySQL system to the other system, without incurring downtime. Currently, real-time operations from MySQL databases are usually not integrated with the enterprise data warehouse on a real-time basis. In accordance with an embodiment, the method provides a way for enterprises to obtain data from MySQL systems.

In accordance with an embodiment, the system uses MySQL's binary log feature to capture data. The MySQL binary log contains statements data that modifies data in, e.g. DML operations. Statements are stored in the form of "events", which describe modifications to the data. In accordance with an embodiment, the binary log serves two important purposes: (1) replication, in which the binary log is used on master replication servers as a record of the statements to be sent to slave servers. The master server sends the events contained in its binary log to its slaves, which execute those events to make the same data changes that were made on the master; and (2) data recovery, in which certain data recovery operations require use of the binary log. After a backup file has been restored, the events in the binary log that were recorded after the backup was made are re-executed. These events bring databases up to date from the point of the backup.

Enabling the binary log to store transaction data is not set by default upon installation of MySQL. In accordance with an embodiment, the parameter 'log-bin' can be used to enable the binary logging. This parameter is specified in the MySQL initialization file (which is my.ini for the Windows platform; and my.conf in other platforms). In previous releases of MySQL, the binary log contained statement level information, i.e. it logged full DDL and DML statements. In order to have data available in universal data formats to support heterogeneity, it is difficult to build a log-based capture based on pure text SQL statements. Later versions of MySQL introduce binary logging support, which can be used to alleviate the above issues. MySQL version 5.1 also introduces new internal C++ classes to provide access to the binary data.

In accordance with an embodiment, the MySQL binary logs are created and numbered sequentially, as opposed to the circular logging style found in other database such as Ingress and Sybase. MySQL does not archive the old log files automatically, so care must be taken by the administrator to keep/backup their older log files.

In accordance with an embodiment, updates to non-transactional tables are stored in the binary log immediately after execution. Within an uncommitted transaction, all updates (UPDATE, DELETE, INSERT) that change transactional tables, such as InnoDB tables are cached until a COMMIT statement is received by the server. At that point, a server daemon (mysqld) writes the entire transaction to the binary log. The server daemon does not write transaction data if a ROLLBACK statement is issued. With respect to the binary log, the rollback operation is a no-op, non-recorded operation.

FIG. 1 is an illustration of the overall architecture of a system for heterogeneous log based replication, in accordance with an embodiment. As shown in FIG. 1, the architecture 102 comprises a MySQL or similar database 104, which is configured to log data in a current binary log file 106 (or a plurality 108 of binary log files), using the configuration settings and parameters described above.

In accordance with an embodiment, the system can optionally comprise one or more MySQL Libraries 110, to provide file reader, file CACHE, and data conversion classes. In accordance with other embodiments, this particular component is not needed.

A Vendor Access Module (VAM) plug-in or application program interface (API) 111, or similar component, is used to provide access to the binary log files by a data capture and replication system or product, such as Oracle GoldenGate, or a similar replication product. In accordance with an embodiment, the VAM includes a plurality of MySQL VAM event classes 112, which can be used to provide processing of events from the MySQL binary log, such as opening a current binary log, reading the events, converting them into VAM records, handling log rotation etc; a plurality of MySQL VAM binary log classes 114, which can be used to wrap around the MySQL Libraries; and a plurality of VAM reader and processor classes 116, which can be used to read and process records from binlog classes and put them into a record queue. In accordance with an embodiment, some or all of these classes can have their own dedicated thread and not block by extract call. In accordance with other embodiment, while the description above illustrates the use of a MySQL environment, and a MySQL VAM, it will be evident that other types of VAM can be implemented with other types of database or system.

In accordance with an embodiment, a record queue 118 is provided to hold records for the subsequent consumption by a VAMRead ( ) call. A plurality of VAM record classes 120 can be used to read data from the record queue and send the data to extract using the VAM API. An extract process 122, such as Oracle GoldenGate or a similar replication process, is compiled to capture data from the VAM API, and write the data to a trail 124, or a trail file, such as a GoldenGate trail file, for communication to a target system 126 and/or target database 128.

In accordance with an embodiment, MySQL stores data inside the binary logs as event entries, supports various events based on the nature of SQL statements and operation, and provides C++ classes to read event data. In accordance with an embodiment, the VAM is generally configured to recognize a subset of these binary log events. For example, the VAM can be configured to recognize those binary log events that represent transactions, DML statement data, log rotation etc. Table 1 shows a list of MySQL events that a MySQL VAM can be configured to recognize from the binary log, in accordance with an embodiment. It will be evident that in accordance with other embodiments, other types of events may be recognized.

TABLE 1

| Event Name | Description | C++ Class |
|---|---|---|
| Query Event | Represents SQL query. BEGIN, ROLLBACK transactions and TRUNCATE statement are represented by this event. | CQueryEvent |
| XID Event | Represents COMMIT transactions. | CXidEvent |
| Table Map Event | Contains database name, table names and column metadata information. | CTableMapEvent |
| Write Rows Event | Contains list of rows inserted as part of INSERT operation. | CRowsLogEvent |
| Update Rows Event | Contains list of rows updated as part of UPDATE operation. Contains both before image as well as after image data. | CRowsLogEvent |

TABLE 1-continued

| Event Name | Description | C++ Class |
|---|---|---|
| Delete Rows Event | Contains list of rows deleted as part of DELETE operation. | CRowsLogEvent |
| Rotate Event | Represents the occurrence of log rotation. Contains new log file name. | CRotateEvent |
| Stop Event | Represents the occurrence of server shutdown. | CStopEvent |
| Format Description Event | Describe binary log status such as active, header structure, etc. | CFormatDecriptionEvent |

In accordance with an embodiment, the VAM implementation can be written using C++, and implementation of the VAM module can be split into two major parts: a first part that reads the binary log events using internally developed event C++ classes, processes them in to data records, makes the records in readymade format (ready to send) and stores it into a limited size queue; and a second part that fetches the record from the queue and sends it to the API whenever it has received a request from the API.

Log Index File

Figure 2:
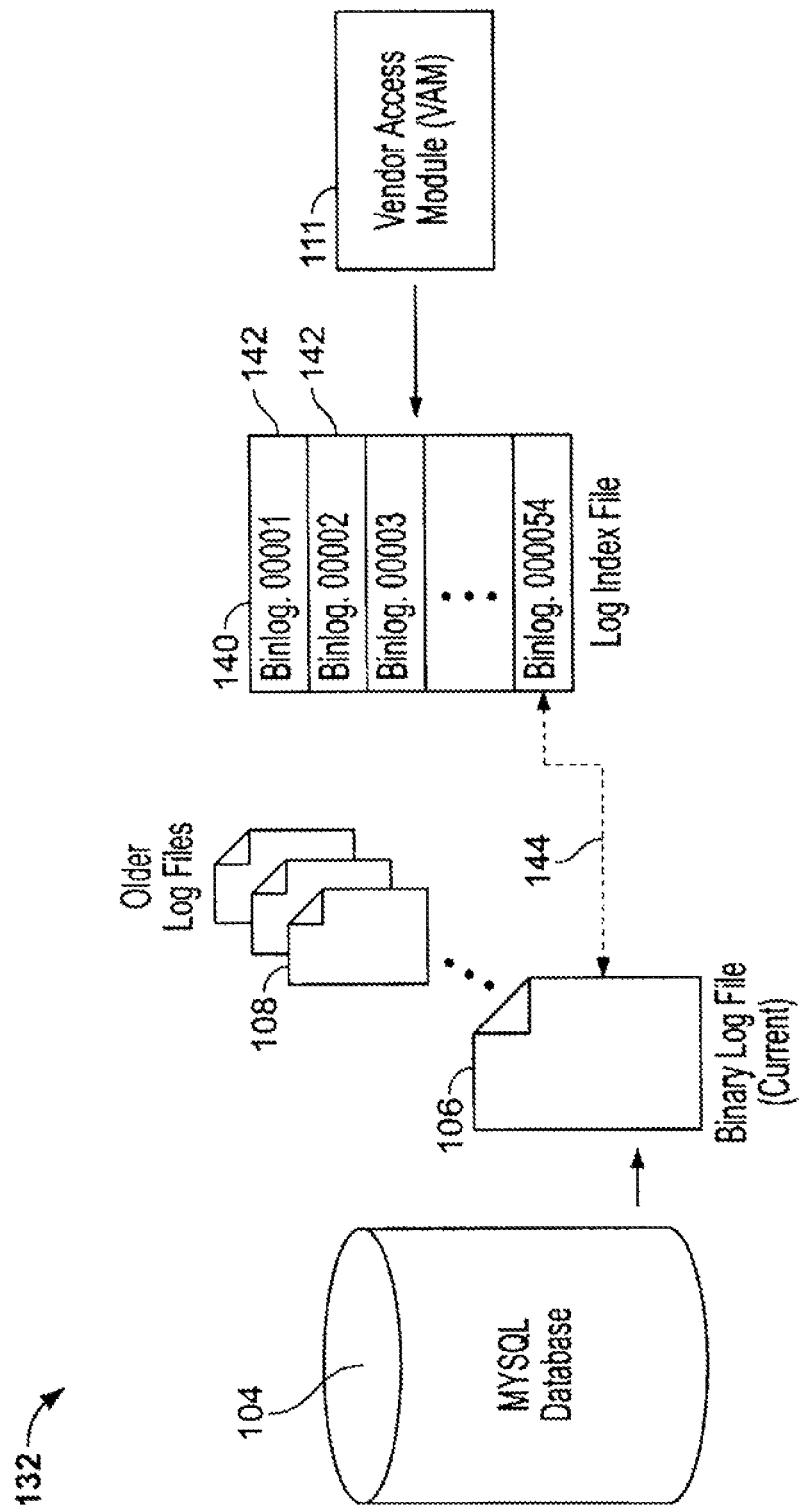
FIG. 2 is an illustration of the use of a log index file to determine a current binary log file, in accordance with an embodiment.

FIG. 2 is an illustration of the use of a log index file to determine a current binary log file. In accordance with an embodiment, MySQL uses a log index file to maintain a list identifying the current binary log file, as well as older log files. This log index file is located in the same directory location as binary log. The system can read from the configuration file to determine the log file format, e.g. whether it is ROW, STATEMENT, or MIXED format, and abend if it is not ROW. During initialization, the VAM needs to obtain the name of the active binary log file. As shown in FIG. 2, in accordance with an embodiment 132, the MySQL database 104 can write data changes to a current binary log file 106 (or a plurality 108 of binary log files), using the configuration settings and parameters described above. To determine the active binary log, the VAM 111 obtains the MySQL installation home either from an environment variable or supplied VAM parameter; reads the MySQL initialization file (i.e. the my.ini in the Windows platform, or the my.conf file in other platforms); obtains the value of 'log-bin' parameter to obtain the log directory location as well as the log index file name; opens the log index file 140 and reads the content 142. From this content, the VAM can determined the last log file in the list, and uses this information to open 144 the particular log file, and check if the log file is still in use by the server (e.g., by checking Format description event's flag value to LOG_EVENT_BIN-LOG_IN_USE_F). If yes, then the MySQL server is using this log file currently for writing, and VAM will treat this log file as the active log file.

Figure 3:
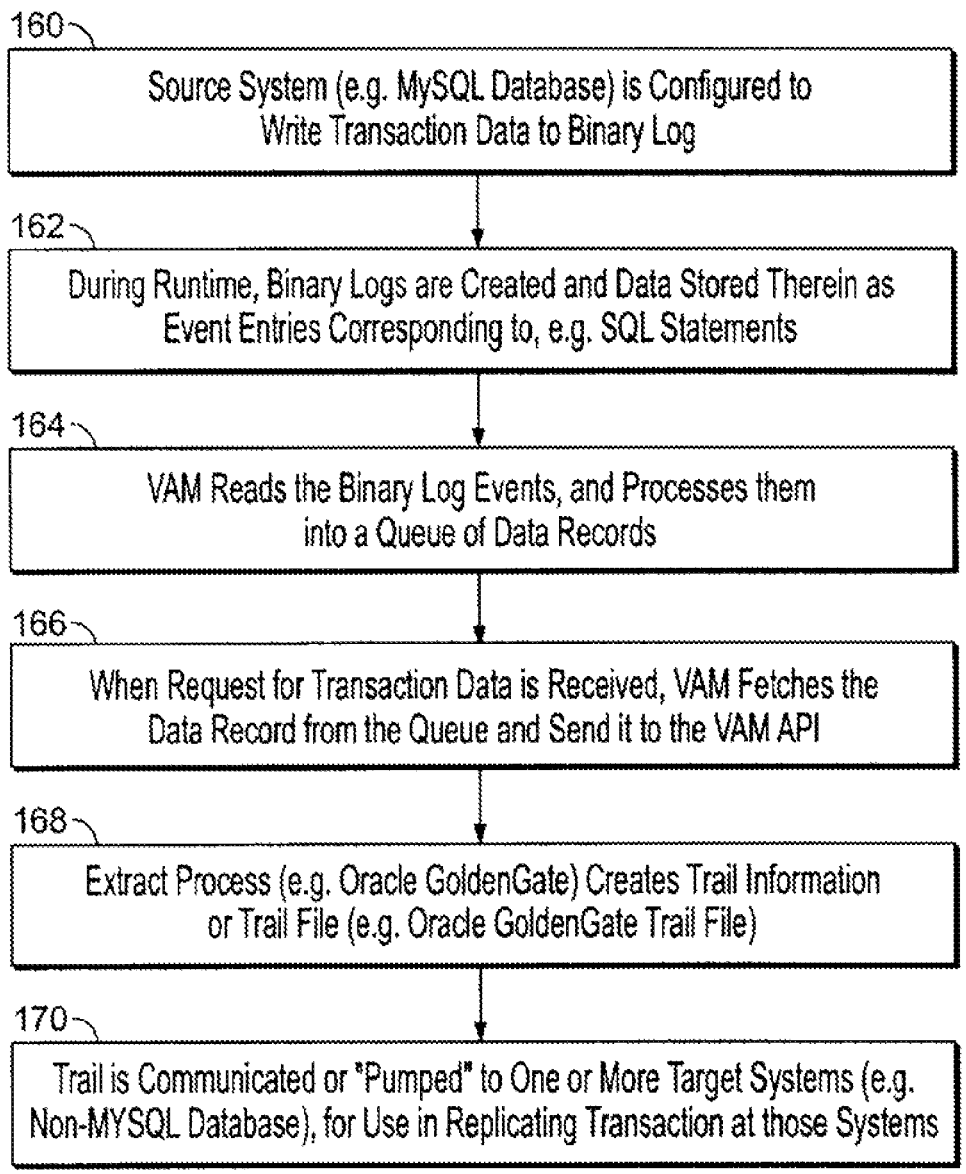
FIG. 3 is a flowchart of a process for heterogeneous log based replication, in accordance with an embodiment.

FIG. 3 is a flowchart of a process for heterogeneous log based replication, in accordance with an embodiment. As shown in FIG. 3, in step 160, the source system (e.g. MySQL database) is configured to write transaction data to a binary log. In step 162, during runtime, one or more binary logs are created and transaction or changed data is stored therein as event entries corresponding to, e.g. SQL or other database statements. In step 164, the VAM (in the case of a MYSQL database a MYSQL VAM) reads the binary log events, and processes them into a queue of data records. In step 166, when a request for transaction data is received, the VAM fetches the data record from the queue and send it to the VAM API. In step 168, an extract process (e.g. Oracle GoldenGate) read from the API and creates a trail information or a trail file (e.g. an Oracle GoldenGate Trail File), reflecting the transaction or changed data. In step 170, the trail information or trail file is communicated or "pumped' to one or more target systems (e.g. a target database), for use in replicating transaction at those target systems (again using, e.g. Oracle GoldenGate or another product).

Log Rotation

In accordance with an embodiment, a particular type of event which can be associated with the binary log is the RotateEvent, which is logged in the binary log indicating possible log rotation, i.e. whenever the MySQL server closes the current binary log and opens the new one. Possible reasons for log rotations include, e.g. if the size of the log file exceeds a 'max_binlog_size' parameter, or if an explicit 'flush logs' command has been issued from the MySQL command console. In these instances, MySQL creates a Rotate event in the current binary log, closes the current binary log, and opens a new binary log for further processing. The Rotate event indicates the new log file to be created. In accordance with an embodiment, the VAM can use this value to close the existing binary log file, open the new binary log file, and continue its reading.

In accordance with an embodiment, a Rotate event is represented by a CRotateEvent C++ class, defined as:

```
class CRotateEvent: public CLogEvent
{
public:
    const char* m_newLogFile; /* name of the new log file name */
    uint m_newLogRFileLen;
    ...
}
```

In accordance with an embodiment, the following scenarios cause MySQL's log rotation (i.e. closing an existing active log file, and opening a new log file):

1. When the active log file size exceeds the value of 'max_binlog_size' (as specified in either the my.ini or my.conf file). In this scenario:
    a. MySQL logs a 'Rotate Event' in the active binary log. The Rotate Event data section contains the location and name of the new active binary log file.
    b. MySQL closes the active binary log and resets the Format description event flag to NULL.(this flag was set previously with LOG_EVENT_BINLOG_IN_USE_F value)
    c. MySQL creates a new binary log and sets the Format description event flag to LOG_EVENT_BINLOG_IN_USE_F value.
2. When an explicit 'flush logs' command is issued in the MySQL SQL prompt. In this scenario:
    a. MySQL logs a 'Rotate Event' in the active binary log. The Rotate Event data section contains the location and name of the new active binary log file.
    b. MySQL closes the active binary log and resets the Format description event flag to NULL. (This flag was set previously with LOG_EVENT_BINLOG_IN_USE_F value)
    c. MySQL creates a new binary log and sets the Format description event flag to LOG_EVENT_BINLOG_IN_USE_F value.
3. During server shutdown. In this scenario:
    a. MySQL logs a 'Stop Event' in the active binary log.
    b. MySQL closes the binary log, and also resets the format description event's flag to NULL value. (This flag was set previously with LOG_EVENT_BINLOG_IN_USE_F value).
4. During the server startup. In this scenario:
    a. MySQL creates a new binary log, and sets the Format description event flag to LOG_EVENT_BINLOG_IN_USE_F value.

In accordance with an embodiment, during the above-mentioned scenarios 1 and 2, the VAM uses the Rotate Event to identify the occurrence of log rotation, and uses the Rotate Event's data to get the next binary log name. The VAM then opens the next binary log and continues its binary log reading. During the above-mentioned scenarios 3 and 4, when the VAM encounters the Stop Event, it closes the binary log that it uses, and checks the log index file for the presence of next binary log. If the VAM finds a next binary log in the index file, it opens the binary log and continuous its reading. If the VAM could not find any new log file name in the index file (e.g. the server is still in the shutdown mode, or never started after the shutdown), the VAM informs the extract to abend.

During a server crash, there is a small chance that the flag of the Format description event is not going to be reset by the server during the server restart, or that the MySQL server neither logs the Rotate Event nor logs the Stop Event in the active binary log file. During the subsequent startup, the server creates new binary log file without resetting flag in the previous binary log. In accordance with an embodiment, in this situation, two binary logs would have LOG_EVENT_BINLOG_IN_USE_F status flag set. The VAM might encounter this scenario under following conditions: (1) The VAM is currently processing active binary log. Server crash happens at the time of reading. In this instance it is advisable to stop the extract, do the crash recovery and restart the VAM after the server startup; and (2) The VAM is positioned to read an older log file. While reading from one file to another file (i.e. log rotation), it encounters a log file flag with the value of LOG_EVENT_BINLOG_IN_USE_F. Also note that this log file is not the latest log file (i.e. not an active binary log). When EOF is occurred, MySQL VAM could check the log index file for the existence of next log file. In this instance, the VAM assumes that server crash was happened previously and close the exiting log file and open the next log file and do the continues log reading.

Figure 4:
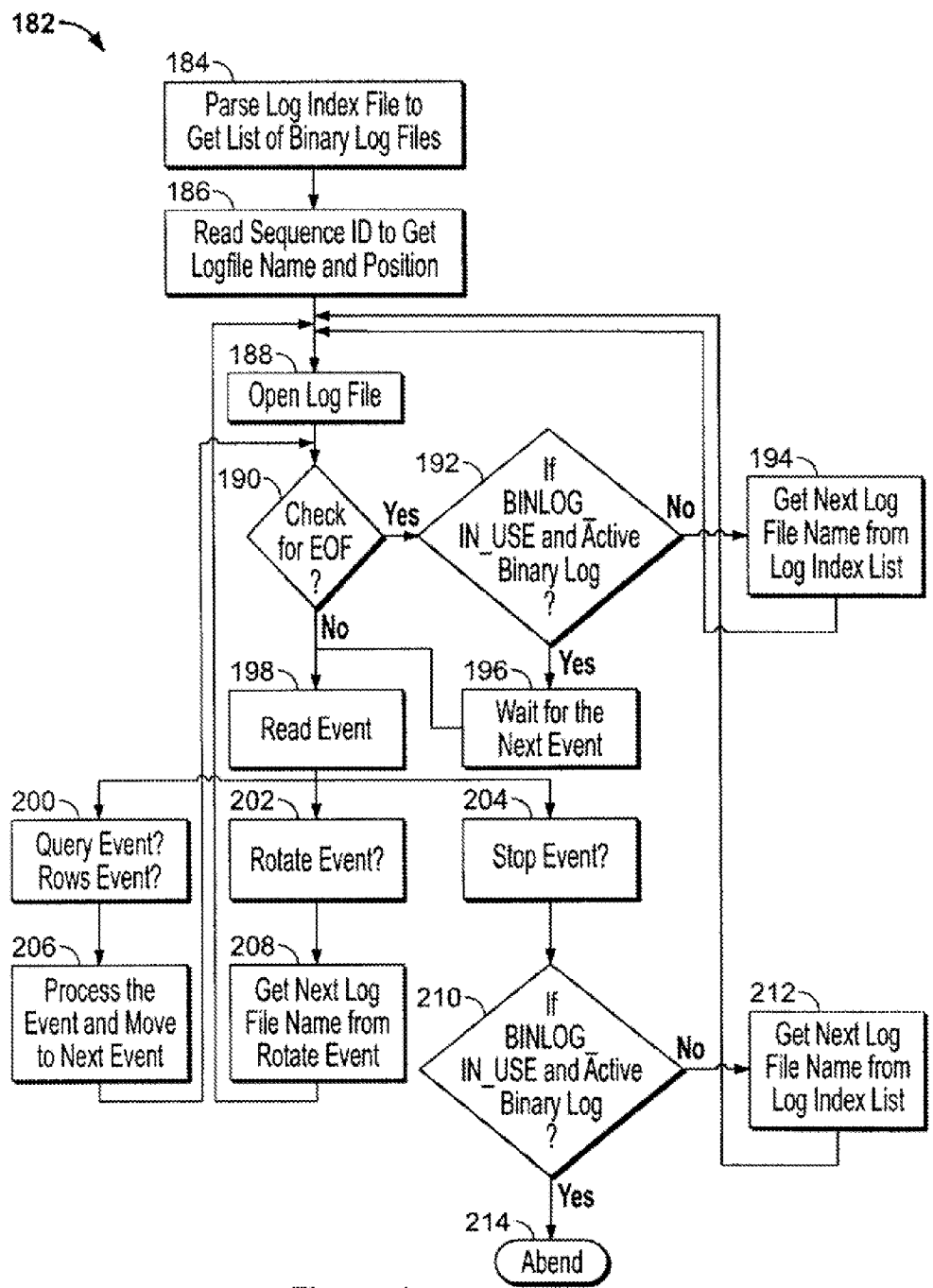
FIG. 4 is an illustration of the use of log rotation, in accordance with an embodiment.

FIG. 4 is an illustration of the use 182 of log rotation, in accordance with an embodiment. As shown in FIG. 4, in step 184 the VAM parses the log index file to a list of binary log files. In step 186, the sequence ID is read to get the logfile name and position. In step 188, the log file is opened. In step 190, the file is checked for any EOF, and in step 198, if no EOF is reached, then the events are sequentially read from the log file. In steps 200 through 204, the VAM determines events such as query events, rows events, rotate events, and/or stop events. In step 206, the VAM processes an event and moves to a next event. In step 208, the next log file can be obtained from the Rotate event information.

VAM Implementation

As described above, in accordance with an embodiment, the system and method enables the use of log-based replication to transfer data between, e.g. a MySQL database or system and another type of database or system; or a database product such as MySQL and a data replication product such as Oracle GoldenGate. The following sections describe a particular implementation of such an embodiment and corresponding Vendor Access Module (VAM) or application program interface (API).

Binary Log Support

As described above, in accordance with an embodiment, the VAM (MySQL VAM) uses a MySQL binary log to capture data. The MySQL binary log contains a statements data that modifies data such as DML operations. Statements are stored in the form of "events" that describe the modifications.

The binary log serves two important purposes: Replication, in which the binary log is used on master replication servers as a record of the statements to be sent to slave servers—the master server sends the events contained in its binary log to its slaves, which execute those events to make the same data changes that were made on the master; and Data Recovery, in which certain data recovery operations require use of the binary log.

After a backup file has been restored, the events in the binary log that were recorded after the backup was made are re-executed. These events bring the databases up to date from the point of the backup. For a full backup, a user (e.g. a customer) can use a 'MySQLDump' utility, and thereafter use binary log for incremental backup.

Binary Log Configuration

In accordance with an embodiment, enabling the binary log to store transaction data is not set by default with the installation of MySQL. Instead, the parameter log-bin' should be used to enable the binary logging. This parameter is specified in the initialization file my.ini for windows platform or my.conf in other platforms.

Prior to the MySQL 5.1 release, the binary log contained statement level information, i.e. it logged full DDL and DML statements. In order to have data available in a universal data format to support heterogeneity, it is difficult to build a log based capture based on pure text SQL statements. However, MySQL 5.1 release introduces binary logging support that alleviates the above issues. Also, MySQL provides internal C++ classes to access this binary data.

In accordance with an embodiment, the following steps are necessary to configure MySQL server to enable binary logging: Open MySQL server configuration file (my.ini for windows or my.conf in other platforms); Enable the binary logging using 'log-bin' parameter—the value of this option specifies the directory location for the log file. For example:

log-bin="C:/MySQL/MySQL Server 5.1/log/test.bin"

In the above example, the name of the log files are created with 'test.00001, test.00002 . . . ' etc. These files are stored in "c:/MySQL/MySQL Server 5.1/log" directory. In the configuration file, the logging format should be configured as 'ROW' mode only. 'MIXED' mode is not supported. This option enables the DML statements to log the data in the binary format. This can be achieved using 'binlog_format' parameter. A 'max_binlog_size' option can be used to specify the binary log file size (in bytes). The minimum value should be 4096.

MySQL's binary logs are created and numbered sequentially, as opposed to a circular logging style found in other vendors such as Ingress and Sybase. MySQL does not archive old log files automatically, so care should be taken by the end user/customer to keep/backup their older log files. In accordance with an embodiment, the following process creates a new binary log file and closes the existing log file: Whenever server daemon, mysqld is started; Explicit flush commands from MySQL command console program (mysql) such as FLUSH LOGS or FLUSH MASTER—the server also creates a new binary log file automatically when the current log's size reaches max_binlog_size parameter.

In accordance with an embodiment, MySQL maintains an index file that contains the list of binary log files, including actively used as well as older ones. This index file is present in the same directory location as other binary logs. MySQL binary log does not support turning off/on logging specific tables/columns.

Transactions and Binary Logs

In accordance with an embodiment, updates to non-transactional tables are stored in the binary log immediately after execution. Within an uncommitted transaction, all updates (UPDATE, DELETE, INSERT) that change transactional tables such as InnoDB tables are cached until a COMMIT statement is received by the server. MySQL opens a temporary file to flush the cache in order to accommodate more data from the update operation. At that point, mysqld (server daemon) writes the entire transaction to the binary log. The server daemon does not write transaction data if ROLLBACK statement is issued. As far as binary log is concerned, the rollback operation is a no-op, non-recorded operation.

When rolling back a transaction that is mixed with updates to both transactional as well as non transactional tables, the server daemon records explicit ROLLBACK statements to the log. A SAVEPOINT statement is used to set a named transaction savepoint with any name. The ROLLBACK TO SAVEPOINT statement is used to rollback the transaction for the named savepoint. MySQL does not support nested transactions or naming of a transaction. If a new transaction is started, or server is closed without ending the previous one with a COMMIT or ROLLBACK, MySQL will automatically commit the previous transaction's data to disk before beginning a new transaction or before server shutdown. MySQL does not split the transaction between multiple binary files.

In accordance with an embodiment, it is possible to allow the size of the binary log file to exceed the value specified using max_binlog_size parameter, if the transaction data size exceeds this parameter value. No operation updates (updates results in 'zero' columns) are not written to binary logs. This also applies for empty transactions. When a trigger is used to update a column to itself MySQL logs the result of the trigger updates rather than the result of the statement updates. For example, with the following triggers, an update of age to 20 causes MySQL to log the value of 25 (result of the trigger) rather than 20:

```
create table customers (age int, name varchar(20));
CREATE TRIGGER upd_check BEFORE UPDATE ON customers FOR EACH ROW
BEGIN
    IF NEW.age < 25 THEN
        SET NEW.age = 25;
    END IF;
END;//
```

Platform Support

In accordance with various embodiments, the system can support Windows, Linux Operating system, HPUX, and Solaris OS. In order for the MySQL VAM to capture the binary log event, the following permissions need to be given for the MySQL extract process (the following permissions are applicable to non windows platforms): Read and Execute permissions for the directory where the configuration file (my.cnf) is located and for the directory where binary logs are generated; Read permission for the configuration file (my.cnf); Read, Write (used by MySQL daemon process); Execute permission for the tmp directory (defined).

Version Support

MySQL supports binary logs from the release 3.x onwards. Before Release 5.1, modifications to the database tables via DML operations were logged in the binary logs as SQL statements (in text form). From Release 5.1 onwards, MySQL binary logs stores DML operations as row data in binary form. In accordance with an embodiment, it is easier for the MySQL VAM to read this binary data and convert them to e.g. a GoldenGate universal format, as opposed to dealing with text based SQL statements.

DataType Support

Table 2 shows the data types supported In accordance with an embodiment.

TABLE 2

Numeric Data types

TINY INT - −128 to 127 normal; 0 to 255 UNSIGNED
SMALL INT - −32768 to 32767 normal; 0 to 65535 UNSIGNED
MEDIUM INT - −8388608 to 8388607 normal; 0 to 16777215 UNSIGNED
INT - −2147483648 to 2147483647 normal; 0 to 4294967295 UNSIGNED
BIG INT - −9223372036854775808 to 9223372036854775807 normal;
0 to 18446744073709551615 UNSIGNED
FLOAT - Floating decimal point having precision from 0 to 23
DOUBLE - Floating decimal point having precision from 24 to 53
DECIMAL - Floating data type that stores exact data value having maximum digit of 65.
Stored in Binary format.

String Data types

CHAR - A fixed section from 0 to 255 characters long.
VARCHAR - A string with a maximum length of 65535 characters (character set is derived from character set defined at database level. Table level and column level character set is not supported).
BINARY - A fixed section from 0 to 255 bytes long.
VARBINARY - Sequence of bytes with a maximum length of 65535.

LOB Data types

TINYBLOB, TINYTEXT - With maximum length of 255 bytes
BLOB, TEXT - With maximum length of 65535 bytes
MEDIUMBLOB, MEDIUMTEXT - With maximum length of 16777215 bytes
LONGBLOB, LONGTEXT - With maximum length of 4294967295 Bytes Date and Time Data types DATE - Stored in YYYY-MM-DD format.
TIME - Stored in HH:MM:SS format
YEAR - Stored in YY or YYYY format.
DATETIME - Stored in YYYY-MM-DD HH:MM:SS format
TIMESTAMP - Stored in YYYYMMDDHHMMSS format
Timestamp value is stored in binarylog as four bytes integer. For zero timestamp scenario, this integer value is represented as zero value.
MySQL VAM have following options.
1) Send as juliantimestamp value to API (as zero value)
2) Or format this as '0000-00-00 00:00:00' text and send this as ASCII value to API Special Data types ENUM - A string object with a value chosen from a list of allowed values that are enumerated during column specification when the table is created.
SET - A string object that can have zero or more values, each of which must be chosen from a list of allowed values specified when the table is created.
BIT(M) - A bit-field type. M indicates the number of bits per value, from 1 to 64.
GEOMETRY - Not supported in the first release.

Storage Engine Support

In accordance with an embodiment, the MySQL VAM supports the following storage engines: MyISAM—Non transactional storage engine; and InnoDB—Transactional storage engine.

Supported Database Operations

In accordance with an embodiment, the MySQL VAM can capture the following database operations from the binary log: Start Transaction; Commit Transaction; Rollback Transaction—MySQL does not send the transactions that are roll backed to the binary logs, but MySQL logs the "transaction rollback operation" if transaction involves tables of innoDB and myISAM types participating in the same transaction; Insert operation; Update operation; Delete operation; Truncate operation.

Maximum Row Size and Columns Support

In accordance with an embodiment, the maximum database row size for MySQL (currently 64 k) is supported by all, e.g. GoldenGate applications. The maximum number of columns (currently 3398) for a given MySQL table; maximum object name length for MySQL (schema.table); and maximum object name length for MySQL (schema.table) is supported. MySQL with innodb storage engine includes the limitation that the number of columns should not exceed 1000.

Compressed Updates and Deletes Support

In accordance with an embodiment, the binary log stores column values which are not part of a DML operation. To minimize the data transfer between the MYSQL VAM and capture module, Compressed Updates and Deletes are supported.

AUTO_INCREMENT Column

In accordance with an embodiment, the AUTO_INCREMENT column attribute can be used to generate a unique identity for new rows. Since this column values are system generated in most of the cases, the following two requirements are supported: Propagation of AUTO_INCREMENT column value to the target side—MySQL logs stores this AUTO_INCREMENT column value in the binary log. So on the apply side (i.e. target), replicat process will insert this auto increment column value explicit insert operation—MySQL supports forcing AUTO INCREMENT column to specific value during insert operation; and Bi directional support—During INSERT operation, AUTO_INCREMENT column value gets inserted with next higher value.

MySQL supports two variables (configured via their initializationfile my.ini) 'auto_increment_increment' and 'auto_increment_offset' to resolve any bidirectional auto_increment column issues. These server side variables can be set differently on the source as well as target side to resolve conflicts for bi-directional setups.

Bi-Directional Data Replication Support

In accordance with an embodiment, in order to support bi-directional loop detection, the MYSQL VAM module filters the records based on user id, transaction id. The MySQL binary log does not store these values in their events. Bi-directional loop detection should be supported via trace table or checkpoint table on the target side (configured using FILTERTABLE option). MySQL bidirectional configuration requires the use of a Replicat checkpoint table to identify Replicat transactions for exclusion from capture. Extract ignores transactions that end with an operation on the checkpoint table. To support this functionality, TRANLOGOPTIONS provides a new FILTERTABLE <table> option that specifies the name of the checkpoint table. A Replicat database user can turn off session level binary logging using 'sql_log_bin' variable. So on the apply side; a replicat user should set this value to 0 to turn off the binary logging.

Positioning by LSN and Timestamp

In accordance with an embodiment, the MySQL VAM supports positioning by Timestamp as well as by LSN. Timestamp position is set using ADD/ALTER extract command, for example:

ADD/ALTER EXTRACT extract_name,MYSQL VAM, begin timestamp_value wherein valid Timestamp values are:
  NOW (or now)—Extract takes current timestamp value when it was added or altered.
  MySQLMYSQL VAM reads the transaction records whose timestamp value is equal or greater than this timestamp value.
  Past timestamp value—MySQL VAM searches the log file and reads the transaction record whose timestamp value is equal or greater than this timestamp value.
  Future timestamp value—MySQL VAM waits and read the transaction records whose timestamp value is equal or greater than this timestamp value.
  Position by LSN value is set using ADD/ALTER extract command, for example:
  ADD/ALTER EXTRACT extract_name,MYSQL VAM, lognum log_num, logpos log_pos
where log_num—Log file number. For example, if the log file name is test.000034, then this value would be 34. MySQLMYSQL VAM searches this log file and open it for further reading; and log_pos—Offset value within the log file. Transactional record available after this position will be read by MySQL VAM.

Archive Log Support

As described above, in accordance with an embodiment, MySQL's binary logs are created and numbered sequentially, as opposed to the circular logging style found in other vendors such as Ingress and Sybase. MySQL does not archive their old log files automatically. Log files are kept in a log directory specified in the initialization file. As such, care should be taken by the customer to keep/backup their older log files. In accordance with an embodiment, support of positioning as well as reading older binary log file using MySQL VAM can be provided. The MySQL VAM will return an error or abend the operation if it is asked to position the older log file which was moved to other location by administrator or other backup tools.

DDL Replication

In accordance with an embodiment, the binary logs store DDL statements as text based SQL statements, and MySQL VAM supports this feature.

FetchCols and FetchModCols Support

In accordance with an embodiment, FETCHCOLS and FETCHCOLSEXCEPT can be used to fetch column values from the database when the values are not present in the transaction log record. This option can be used if the database uses compressed updates (where column values are not logged unless they changed). FETCHCOLS and FETCHCOLSEXCEPT ensure that column values required for FILTER operations are available:
  FETCHCOLS fetches the specified column(s).
  FETCHCOLSEXCEPT fetches all columns except those specified. For tables with numerous columns, FETCHCOLSEXCEPT may be more efficient than listing each column with FETCHCOLS.
  FETCHMODCOLS and FETCHMODCOLSEXCEPT can be used to force column values to be fetched from the database even if the columns are present in the transaction log. Values that can be present in the transaction log are those of columns that were either modified or included in supplemental logging:
  FETCHMODCOLS fetches the specified column(s).
  FETCHMODCOLSEXCEPT fetches all columns present in the transaction log, except those specified. For tables with numerous columns, FETCHMODCOL.
In accordance with an embodiment this feature is supported in the capture side.

Initial Load Support

In accordance with an embodiment, the MYSQL VAM includes initial load support. With the popularity of open source database and open source operating system, more and more customers are starting to use MySQL as part of their enterprise. As their business grows, organizations may like to move to Oracle/DB2/SQLServer from MySQL to manage their complex data management, usually by following steps:
  Step 1, migrate existing MySQL's data to customer's database of choice. Capture side Initial Load support can be used to solve this problem;
  Step 2, after the successful migration, enable real time replication (or change data capture). The MySQL VAM can be used to solve this problem.
The following initial load methods are supported: Loading Data with Replicat-Extract process extracts data directly from the table. This method is slower in nature since one record is applied at a time in the apply side; Loading data with Bulk-load utility—Extract process output records in ASCII format which can be consumed later by SQL-LOADER or BCP; and Loading data with a GoldenGate direct load—Extract process extracts data directly from the table and invoke replicat process. Loading data directly to SQL*Loader.

Miscellaneous Requirements

In accordance with an embodiment, the MySQL VAM module does not change the binary log content i.e. by adding additional truncation points (in Sybase case). So the support of more than one extract process reading on the same binary log is possible. In accordance with an embodiment, MySQL VAM should coexist with MySQL database configured with replication option. Care should be taken to avoid adding new parameters in the extract or using MySQL specific parameter files.

Case Sensitivity

In accordance with an embodiment, MySQL maps the database name as directory name, and table name as file name (.frm file holds the metadata about the table). Case sensitive table name depends upon the underlying operating system in which MySQL runs. MySQL does not distinguish table names with mixed cases in the windows platform and case sensitive in most varieties of UNIX platform.

Character Set Support

In accordance with an embodiment, MySQL supports UNICODE character set for CHAR, VARCHAR, TEXT and ENUM column types. MySQL supports both UTF8 as well UTF16 (ucs2) encoding for its string columns. For UNICODE character set, the data needs to be stored in the trail file as UTF16 value. In case of UTF8 encoding for string columns, the MYSQL VAM module, initial load module as well as apply side module uses internal conversion libraries to convert its data to (or from) UTF16 values. MySQL supports NCHAR, NVARCHAR column types. They are internally mapped as column with UTF8 character set. MySQL capture supports UTF8 and UCS2 character set in the very first release. In accordance with an embodiment, the MySQL capture and apply module is certified with UNICODE character set.

Additional Configuration Requirements

In accordance with an embodiment, the MySQL VAM requires the environment variable 'MYSQL_HOME' to be setup correctly. This variable must point to the installation location of the MySQL database. MySQLMYSQL VAM uses this variable to lookup the MYSQL configuration file (my.ini in windows platform and my.conf in the non windows platform). Also, the following parameters must be set inside the MySQL configuration file (my.ini or my.conf):

Enable the binary logging using 'log-bin' parameter—value of this option specifies the directory location for the log file; Specify the logging format using 'binlog_format' parameter—this should be configured as 'ROW' mode only. 'MIXED' and 'STATEMENT' mode are not supported. For example:

```
[mysqld]
log-bin="C:/MySQL/MySQL Server 5.1/log/test.bin"
binlog_format = ROW
```

In this example, the name of the log files are created with 'test.00001, test.00002' etc. These files are stored in "c:/MySQL/MySQL Server 5.1/log" directory.

Direct Use of MySQL C++ Classes

MySQL does not have a well defined log API available to the outside world, but it has a well defined file access IO_CACHE class as well as event classes (exposed in C++), that mirror the content of the binary log. MYSQL has separated reading as well as processing of log events. The internal IO_CACHE classes read binary logs data in a chunk on demand basis. (of 64 k size minimum, to avoid disk IO overhead). These classes provide APIs to read from this block. On the processing side, MYSQL has event classes that can be used to cast this data to event specific C++ class. These publically available MySQL classes have following drawbacks: IO_CACHE classes reads binary log event data (if size is more than 64 k) in one single shot into the memory. For events containing larger data (for example, LOB data of size 2 GB), this could be an issue; IO_CACHE classes implement pthread specific functions on its own. This creates set of linker errors (redefinition) while MySQL VAM linking with extract module.

In accordance with an embodiment, the MySQL VAM can reimplement both IO_CACHE class as well as event processor classes. This gives complete control for MySQL VAM accessing binary log. Also this alleviates the problem of linker errors, larger LOB data fetching, and dependency on MySQL specific source code files or header files.

In accordance with an embodiment, MySQL VAM can reimplement C++ classes for processing events and use the IO_CACHE classes for the buffered IO read. This approach reduces the dependency on MySQL source code to be in, e.g. GoldenGate build environment. Also this approach gives complete control of how MySQL VAM processes the event data. Frequently used event instances can be recycled as well.

In accordance with an embodiment, MySQL VAM can use MySQL specific event classes and IO_CACHE classes to access binary logs. MySQL VAM classes needs to inherit from the event classes to provide needed features specific to MySQL VAM.

Signed or Unsigned integer

MySQL supports integer column defined either as signed or unsigned (default is signed). For example, two bytes signed integer column could support values from −32 k to +32 k and the unsigned one supports 0 to +64 k. The binary log does not return metadata regarding sign of a numeric column, i.e. if it column supports signed or unsigned mode. There are two possible design approaches: Return always a signed value-on the target side, replicat will do the conversion based on the column type; or Get metadata of the MySQL column from extract and return the correct value to extract. In accordance with an embodiment, MySQL VAM returns numeric values as signed values to the MYSQL VAM API.

Positioning by Sequence Id

In accordance with an embodiment, inside the binary log, MySQL events have a position value in their header section. The lifecycle of this value is specific to a binary file, i.e. the position value can be unique within a given binary file but not outside of the binary file. Two different events in two different binary file might have same value. In order to identify a transaction record by position uniquely, MySQL VAM combines this event position value with log file name. For example, 'binlog.00054:123', where 'binlog.00054' is name of the binary log and '123' is position of transaction record. MySQL VAM sends this value as ASCII string attributes using GG_ATTR_DS_SEQID.

In accordance with an embodiment, during the restart scenario, extract sends this last received Sequence Id value to MySQL VAM during MYSQL VAMInitialize( ) call. MySQL VAM uses this value to set the correct read position. MySQL VAM parses this Sequence Id value from extract, and get the log file name as well as event position. Then it opens the corresponding log file and start scanning for events. If the event's position matches with the one specified in the sequence Id, MySQL VAM sets this position as current read position and starts reading the binary log content from this position.

Transaction ID

For events representing DML operation, MySQL does not have transaction id as part of the event data. As such, MySQL VAM needs a way to send this transaction id (unique) to MYSQL VAM API. In accordance with an embodiment, to solve this problem, the MYSQL VAM API treats 'Sequence Id' of the 'START Transaction' statement as transaction id. Since this 'Sequence Id' is the combination of logfile name+event offset within the file, uniqueness of transaction id is guaranteed across multiple log files. Also MySQL VAM will maintain this pseudo transaction id internally and send this value to MYSQL VAM API for the all the DML statements with in particular transaction. MySQL VAM clears this value once it encounters 'Commit' or 'Rollback' statement.

Accessing LOB data

In the MySQL binary log, LOB column values are stored inline with other non LOB column values. This is different from other databases since the values are not stored inline as well as accessed using locator or coupon where the data can be fetched on demand. This is not the case for MySQL database (with the storage engine MyISAM as well as InnoDB). For reading LOB column value from the binary log, MySQL internal IO_CACHE class fetches entire value of this LOB column value from the log file to the memory. i.e. memory is allocated completely in one shot for this LOB column by this class.

In accordance with an embodiment, the MYSQL VAM API provides specification outlines that LOB data of bigger sizes should be sent to MYSQL VAM API in chunks. But in MySQL case, the data is already fetched completely by MySQL internal classes (i.e. memory is allocated completely by the IO_CACHE object), LOB data can be sent to MYSQL VAM API in one call as well as multiple call in chunk size of 32 k bytes. In accordance with an embodiment, as described above, MySQL's IO_CACHE class fetches entire value of the lob data along with other row data in one shot. This is problematic if the LOB size is of 2 GB. One approach is to rewrite the implementation of IO_CACHE class so that MYSQL VAM can read the data from file in chunks. Existing file manager libraries from GoldenGate (if any) can be used. In accordance with an embodiment, the system uses IO_CACHE class, and sends the log data to MYSQL VAM API in chunks.

In accordance with an embodiment, the MySQL VAM implementation can make use of IO_CACHE class for reading binary log file. Except for LOB data limitation, IO_CACHE class handles reading other MySQL data very well. Also it is practically rare (or not often) to process the LOB data of 2 GB in size. Irrespective of internal storage mechanism of LOB column value, MYSQL VAM should return the LOB data in chunks to the MYSQL VAM API so that MYSQL VAM API can be paged out if necessary.

OG Processing and MYSQL VAM API Communication

In accordance with an embodiment, the MySQL VAM implementation can be split into two parts: the first part reads the LOG data from the binary log and prepares the data, make the data ready for the MYSQL VAM API—this will be executed in a separate thread; the second part sends the readymade data (record) to the API as per request. The major drawback in the traditional design is everything (the complete process) starts happening only when the MYSQL VAM API requests and obviously MySQL VAM module requires some execution time to complete the process. During this time the MYSQL VAM API is idle and which will decrease the performance of MYSQL VAM. By splitting the design into two parts, this removes the idle time of MYSQL VAM API. As the first part independently reads the binary log, the system can prepare the data to send to API and store it into limited size Queue. Then the second part fetches the readymade record from Queue and sends it to the MYSQL VAM API immediately as and when requests come from MYSQL VAM API side.

Architectural Design

As described above, in accordance with an embodiment, the overall architecture of the MySQL VAM module includes:

MySQL Libraries—Libraries that provide file reader, file CACHE, data conversion classes.

MySQL VAM Event classes—MySQL VAM's in house implementation of processing events from MySQL binary log.

MySQL VAM Binary log classes—Class that wraps around MySQL's libraries, MySQL VAM events classes. Open current binary log, read the events, convert them in to MYSQL VAM records, handles log rotation etc.

MYSQL VAM Reader, Processor class—Classes that read and process record from binlog classes and put it into record queue. These classes have its own dedicated thread and not blocked by extract call.

Record Queue—Queue that holds records later for the consumption by MYSQL VAMRead ( ) call.

MYSQL VAM Record classes—Classes that read data from Record queue and send it to extract using MYSQL VAM API.

Extract process—a standard GoldenGate extract process compiled to capture data from a MYSQL VAM APL Binary Log Structure and Log Events FIG. 5 illustrates the Event Order in a MySQL Binary Log 230 in accordance with an embodiment. In accordance with an embodiment, MySQL stores the data inside the binary logs as event entries. MySQL supports various events based on the nature of SQL statements and operation. MySQL provides C++ classes to read event data. In general, binary log structure contains the following event entries:

1. Starts with a 4-byte magic number, which is defined as constant BINLOG_MAGIC with value of "\xfe\x62\x69\x6e". This value can be ignored.

2. Next entry is Format description event. This event is global across given binary log file. MySQL writes this event only once per binary log. This event tracks if the current binary log is in use or closed properly.

3. The rest of the entries followed by sequence of events are represented in FIG. 5.

In accordance with an embodiment, the MySQL VAM is interested in sub set of binary log events. For example the MySQL VAM is interested in binary log events that represent transactions, DML statement data, log rotation etc. Table 3 shows the list of MySQL events that MySQL VAM is interested in, in accordance with an embodiment.

TABLE 3

| Event Name | Description | C++ Class |
| --- | --- | --- |
| Query Event | Represents SQL query. BEGIN, ROLLBACK transactions and TRUNCATE statement are represented by this event. | CQueryEvent |
| XID Event | Represents COMMIT transactions. | CXidEvent |
| Table Map Event | Contains database name, table names and column metadata information. | CTableMapEvent |
| Write Rows Event | Contains list of rows inserted as part of INSERT operation. | CRowsLogEvent |
| Update Rows Event | Contains list of rows updated as part of UPDATE operation. Contains both before image as well as after image data. | CRowsLogEvent |
| Delete Rows Event | Contains list of rows deleted as part of DELETE operation. | CRowsLogEvent |
| Rotate Event | Represents the occurrence of log rotation. Contains new log file name. | CRotateEvent |
| Stop Event | Represents the occurrence of server shutdown. | CStopEvent |
| Format Description Event | Describe binary log status such as active, header structure, etc. | CFormatDecriptionEvent |

Event Structure

FIG. 6 illustrates the Event Header structure 236 in accordance with an embodiment. All the events have generic header section followed by data section. Some events have optional data header section. The event structure is generally represented as 1. Event Header—Size of the structure is 19 bytes. This section contains the following event specific data which are generic across all the events.

4 bytes—Timestamp of the event. Number of seconds since the start of the year 1970.

1 byte—The type code of the event. The interested values and meaning of the type codes are: QUERY_EVENT=2; STOP_EVENT=3; ROTATE_EVENT=4; FORMAT_DESCRIPTION_EVENT=15; XID_EVENT=16; TABLE_MAP_EVENT=19; WRITE_ROWS_EVENT=23; UPDATE_ROWS_EVENT=24; DELETE_ROWS_EVENT=25.

4 byes—Server ID. Uniquely identifies the server among its replication peers. MySQL VAM ignores this value.

4 bytes—The length of the whole event, including the header, in bytes.

4 bytes—Offset of the event in the log in bytes. This value is similar to LSN or sequence number.

2 bytes—Event flags. MySQL VAM ignores this value. This event header is represented by CLogEvent C++ class. All binary log related event specific C++ classes inherits from this class. The structure of this class is represented as:

```
class CLogEvent
{
time_t m_timestamp;        /* time stamp of this event*/
short m_typecode;          /* event type*/
uint32 m_serverid;         /* server id*/
ulong m_eventsize;         /* size of the event data*/
my_off_t m_logpos;         /* offset of the event in the log*/
uint16 m_flags;            /* event flag */
char *m_tempbuf;           /* buffer to hold event data */
}
```

2. Data Header—Size of the structure is 8 bytes. Event containing variable data (such as Table Map Event, Write Rows Event etc.) contains this section. This section contains
    6 bytes—contains table_id. This can be treated as table version. MYSQL VAM uses this value to check if the underlying table metadata is changed or not.
    2 bytes—Data header flag. MySQL VAM ignores this value.
    3. Data section—Holds event specific data. For example sequence of column values for Write rows event, column metadata for Table map event. See next section for more details.

Event Data Section

In accordance with an embodiment, the event data section holds event specific data. The size of the data section is dynamic i.e. values can be different and specific to event types and holds variable list of data. The following section explains structure of the event data section for the event types that MySQL VAM is interested in.

Query Event

In accordance with an embodiment, this event represents SQL query. This event is represented by MySQL internal C++ class 'CQueryEvent'. The data section of this event contains database name, query string value and other information. MYSQL VAM uses CQueryEvent to retrieve these values using following member variables:

```
class CQueryEvent : public CLogEvent
{
const char *m_query;       /* SQL query string*/
const char *m_dbName;      /* database name*/
uint32 m_querylen;         /* query string length*/
uint32 m_dblen;            /* database name string length*/
....
}
```

MySQL's 'BEGIN Transaction' and 'ROLLBACK Transaction' and 'Truncate' statements are represented by this CQueryEvent class. For these statements, Member 'query' contains value as "BEGIN" or "ROLLBACK" or "TRUNCATE table_name". Normal string comparison routine can be used to filter these statements from the log.

XID_Event

In accordance with an embodiment, this event represents Commit of a transaction. This event is represented by MySQL internal C++ class 'CXidEvent'. Data section of this event contains transaction ID of a two phase commit transaction that MySQL VAM ignores (MySQL replication also ignores this value). MySQL VAM can use this event entry to assume that transaction is committed and free up any transaction specific objects.

Table Map Event

In accordance with an embodiment, this event represents the metadata of the table participating in the transaction (through DML statements). This event precedes any event that represents DML operation such as Write, Update and Delete row events. For example, a simple insert operation causes two entries in the binary log. First entry is a 'Table map event' containing the table metadata and the next entry is 'Write rows event' containing row data added as part of the INSERT operation. Apart from generic header section, this event contains additional data header section plus data section. Data header (of 8 bytes) section contains the following data: table_id:6 bytes length-tracks the table metadata modification; and flags:MySQL VAM can ignore this flag.

Most of the time table map event for a given table remains unchanged if the underlying table structure remains the same. Even though the binary log contains multiple entries of same table map event, it is better to process them once and reuse them later. This speeds up the performance of reading binary log. It is better to use a hash table to store the instance of a Table_map_log_event log class and later retrieve them using table name for further processing.

When a table structure is modified (using 'alter table . . . ' statement), MySQL creates a new table id for the same table. MySQL does not store history of table ids. In the case of changing table metadata while reading binary log, MySQL can handle in following way. 1) ABEND the process. 2) MySQL VAM uses the altered (latest) table definition for further processing. In accordance with an embodiment, the MySQL VAM can check the existing table id for a given table name, if it is different, then this could be assumed as changes in table metadata and MYSQL VAM could signal extract to abend.

The data section of table map event contains following table metadata information:

1 byte - length of database name
n bytes - database name + followed by null terminated char.
1 byte - length of table name
n bytes - table name + followed by null terminated char.
n bytes - number of columns. 1 byte if number of columns is less than or equal to 255 else 2 bytes.
n bytes - stores type of each column in the table, listed from left to right. Each byte is mapped to MYSQL internal column type.
n bytes - size of field metadata. See Field Metadata section (next section) for more details
n bytes - field metadata values. See Field Metadata section (next section) for more details
n bytes - null column bits, rounded up to nearest byte. For each column, a bit indicating whether data in the column can be NULL or not. The number of bytes needed for this isint((column_count+7)/8). The flag for the first column from the left is in the least-significant bit of the first byte, the second is in the second least significant bit of the first byte, the ninth is in the least significant bit of the second byte, and so on.

Field Metadata

Figure 7:
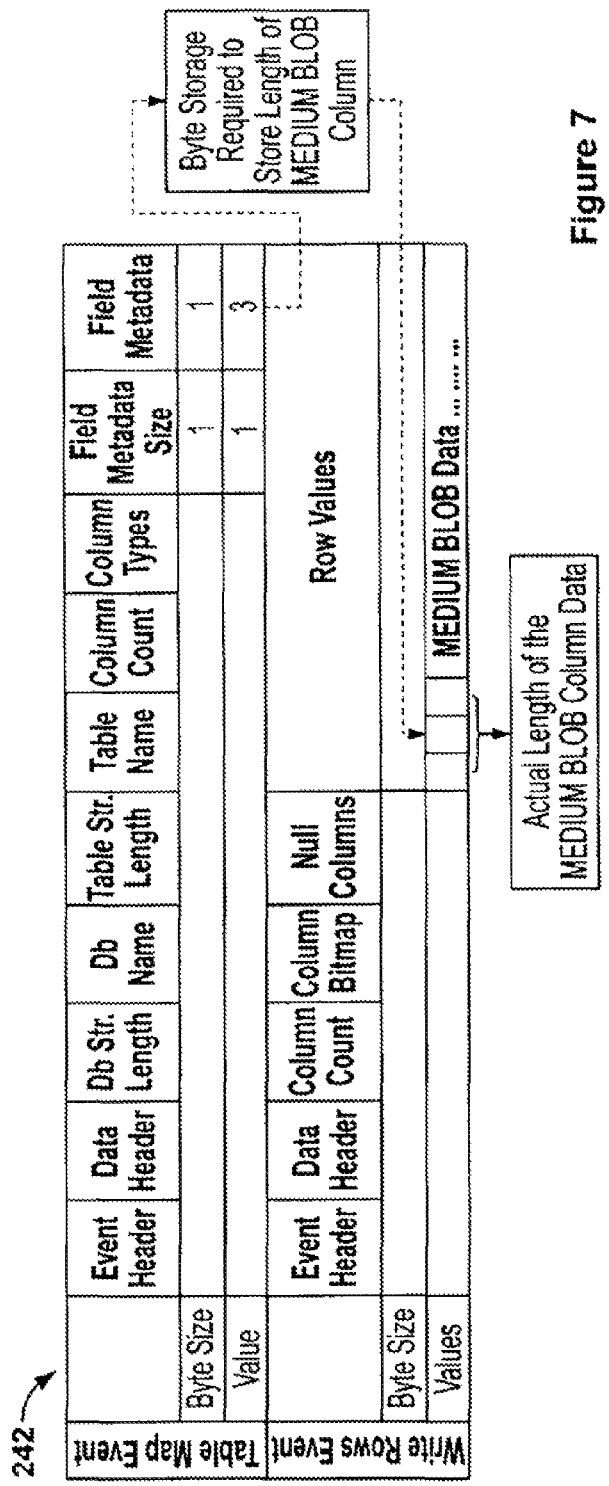
FIG. 7 illustrates an example of the field metadata, in accordance with an embodiment.

FIG. 7 shows the Field Metadata 242 in accordance with an embodiment. Field metadata usually represents additional information pertaining to the size of the column metadata. This can be treated as pack length i.e total number bytes required to pack particular column values. These values are later used for reading appropriate bytes to get actual values. For column types of fixed length (such as integer, date etc), this field metadata is usually zero. For example, for column type of VARCHAR, this field metadata represents maximum size of the VARCHAR column. Table 4 shows the content of the field metadata section for different column types.

TABLE 4

| Column Type | Field Metadata |
| --- | --- |
| MYSQL_TYPE_VARCHAR | 2 bytes. Holds maximum size of VARCHAR column |

TABLE 4-continued

| Column Type | Field Metadata |
|---|---|
| MYSQL_TYPE_FLOAT | 1 byte. Holds maximum size of (float) value. MYSQL VAM ignores this value. |
| MYSQL_TYPE_DOUBLE | 1 byte. Holds maximum size of (double) value. MYSQL VAM ignores this value. |
| MYSQL_TYPE_DECIMAL | 2 bytes. First byte represents precision and the second byte represents scale. |
| MYSQL_TYPE_STRING | 2 bytes. First byte represents sub types. Sub types are MYSQL_TYPE_CHAR, MYSQL_TYPE_ENUM and MYSQL_TYPE_SET. Second byte represents total bytes storage required. |
| MYSQL_TYPE_BIT | 2 bytes. Holds maximum size of the bit column |
| MYSQL_TYPE_BLOB | 1 byte. Holds number of bytes needed to represent the length of the blob. |
| MYSQL_TYPE_INT<br>MYSQL_TYPE_BIGINT<br>MYSQL_TYPE_DATE<br>MYSQL_TYPE_TIMESTAMP<br>MYSQL_TYPE_DATETIME | 0 byte. |

Assume that a table having a blob column of type 'MEDIUM BLOB'. The maximum size of the blob column could be 16777216 bytes (16 MB). The size requires usually 3 bytes. A simple insert operation is done on this table. This insert operation creates both 'Table Map Event' as well as 'Write Rows Event' in the binary log. The binary log stores length of the BLOB column along with actual BLOB data in the 'Write Rows Event' section. In order to retrieve this BLOB data, MySQL VAM need to do following steps:

1. MySQL VAM needs to know the byte storage required to calculate length of this BLOB column (in this example, it is 3 bytes required to store length of 16777216). This value is retrieved from 'field metadata' section of 'Table Map Event'.

2. Based on the above value, In order to find out actual data length, MySQL VAM either read first one or two or three or four bytes of the actual row data value from 'Write Rows Event'. In this case, MySQL VAM needs to read first three bytes to get actual length value of the BLOB data.

3. MySQL VAM allocates enough memory based on the actual length and copy the data from the binary log.

From 'Table Map Event', get the maximum column byte store required for this BLOB column. This should return 3.
column_max_datasize=uint2korr(m_field_metadata);

The above value can be used to get actual data from 'Write Rows Event'.

```
void *data_ptr;       /* holds actual row data*/
longlong length;      /* holds actual data length */
void *data_value;     /* holds local data */
/* read the first few bytes to get the actual length */
if (column_max_datasize == 1)
    length = *data_ptr;
else if (column_max_datasize == 2)
    length = uintkorr(data_ptr);    /* read first two bytes to get the
                                       length */
else if (column_max_datasize == 3)
    length = unit3korr(data_ptr);   /* read first three bytes to get the
                                       length */
else if (column_max_datasize == 4)
    length = uint4korr(data_ptr);   /* read first four bytes to get the
                                       length */
/* allocate memory */
data_value = malloc(length);
/* now jump to data section to read actual data*/
data_ptr+= column_max_datasize;
memcpy(data_value,data_ptr,length);
```

The following example shows byte sequence order of table map event for table 't1', database 'test' describes as:

```
key int not null,
created              date not null,
name                 char(30),
descvarchar(145) not null,
```

Figure 8:
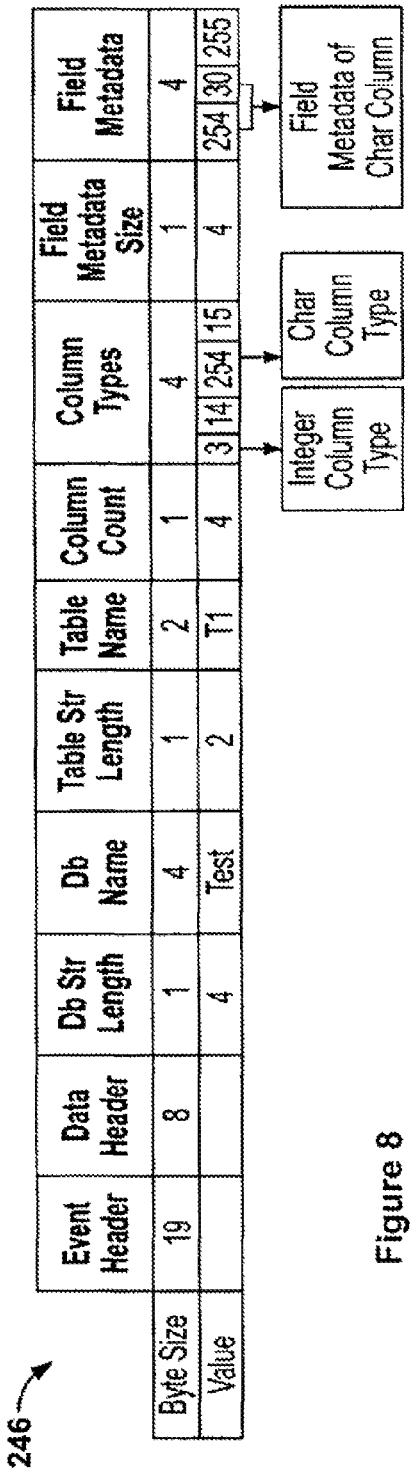
FIG. 8 illustrates an example of the table map event structure, in accordance with an embodiment.

FIG. 8 shows the table Map Event Structure 246 in accordance with an embodiment. The table map event is represented by C++ class 'CTableMapEvent'; and its Class structure is as follows:

```
class CTableMapEvent : public CLogEvent
{
    size_t       m_dbNameLen;      /* database name string
                                      length*/
    char const   *m_dbName;        /* database name*/
    size_t       m_tblNameLen;     /* table name string length*/
    char const   *m_tblName;       /* table name */
    ulong        m_columnCnt;      /* total number of columns */
    uchar        *m_colType;       /* byte array of column types */
    uchar        *m_fieldMetadata; /* byte array of field
                                      metadata*/
    ulong        m_tableId;        /* table id of the table*/
    col_md*      m_columnMetadata; /* MYSQL VAM
                                      representation
                                      of column metadata */
    ..
}
```

WriteRowsEvent

FIG. 9 shows a write Rows Event Structure 250 in accordance with an embodiment. This event represents MySQL INSERT operation. This event is preceded by Table map event. Apart from generic header section, this event contains additional data header section plus data section. Data header (of 8 bytes) section contains following data, which is similar to preceding Table Map Event.

table_id: 6 bytes length. It can be compared against preceding table map event's table_id. But not much useful; MySQL VAM ignores this value.

flags: MySQL VAM can ignore this flag.

The data section of WriteRowsEvent contains column values arranged based on column orders. WriteRowsEvent is represented by CWriteRowsEvent class. Data section contains following information:

1 or 2 bytes—stores number of columns. Maximum column supported in MySQL is 3398.

n bytes—column bitmap. This is an internal data structure used by MySQL replication. MySQL VAM usually ignores this value. Size is ((no_of_cols+7)/8).

n bytes—Indicates null column values in (little-endian orders). Total size is usually ((no_of cols+7)/8). The flag for the first column from the left is in the least-significant bit of the first byte, the second is in the second least significant bit of the first byte, the ninth is in the least significant bit of the second byte, and so on.

n bytes—byte sequence of insert values. Variable column values (such as VARCHAR, LOB, CHAR types) are preceded by its length.

The following example shows byte sequence order of WriteRowsEvent for a table t2.

```
SQL> Insert into t2 values (
    1,
    '2008-12-08',
    'Grizzly',
    'Special type of bear in masaimara');
```

UpdateRowsEvent

FIG. 10 shows an Update Rows Event Structure 254, in accordance with an embodiment. This event represents MySQL UPDATE operation. This event is preceded by Table map event. Apart from generic header section, this event contains additional data header section plus data section. Data header (of 8 bytes) section contains following data, which is similar to preceding Table Map Event.

table_id: 6 bytes length. It can be compared against preceding table map event's table_id. flags: MySQL VAM can ignore this flag.

The data section of UpdateRowsEvent contains column values arranged based on column orders. UpdateRowEvent data section contains both before image as well as after image data values. Unlike other logging system, MySQL binary log stores entire copies of column values (both before as well as after image values) instead of just storing primary keys or updated columns. For example, updating one column on a table containing 100 columns; creates before image copy of 100 column values as well as after image copy of the same 100 columns. It is important for MySQL VAM to compress (or filter) the data before sending the data to MYSQL VAM API (extract). UpdateRowsEvent is represented by CUpdateRowsEvent class. The data section contains following information:

1 or 2 bytes—stores number of columns. Maximum column supported in MySQL is 3398.

n bytes—column bitmap. This is an internal data structure used by MySQL replication. MySQL VAM usually ignores this value. Size is ((no_of_cols+7)/8).

n bytes—after image column bitmap. This is an internal data structure used by MySQL replication. MySQL VAM usually ignores this value. Size is ((no_of_cols+7)/8).

n bytes—Indicates null column values in (little-endian orders) for before image data. Total size is usually ((no_of_cols+7)/8).

n bytes—byte sequence of values for before image data. Variable column values (such as VARCHAR, LOB, CHAR types) are preceded by its length.

n bytes—Indicates null column values in (little-endian orders) for after image data. Total size is usually ((no_of_cols+7)/8).

n bytes—byte sequence of values for after image data. Variable column values (such as VARCHAR, LOB, CHAR types) are preceded by its length.

DeleteRowsEvent

This event represents MySQL DELETE operation. This event is preceded by Table map event. Apart from generic header section, this event contains additional data header section plus data section. Data header (of 8 bytes) section contains following data, which is similar to preceding Table Map Event. DeleteRowsEvent is represented by CDeleteRowsEvent class table_id: 6 bytes length. It can be compared against preceding table map event's table_id.

flags: MySQL VAM can ignore this flag

Data section of DeleteRowsEvent contains the column values arranged based on column orders. Data section is similar to WriteRowsEvent's data section.

CRowsLogEvent C++ class

CWriteRowsEvent, CUpdateRowsEvent and CDeleteRowsEvent C++ classes inherit from CRowsLogEvent C++ class. This class contains most of the common operations specific to retrieving log data for INSERT,UPDATE and DELETE operation.

```
class CRowsLogEvent : public CLogEvent
{
    ulong    m_tableId;       /* Table ID */
    ulong    m_columncnt;     /* total no. of columns */
    uchar    *m_nullDataptr;  /* pointer to null column
                                 values*/
    uchar    *m_rowDataptr;   /* pointer to the row data*/
    ..
}
```

RotateEvent

The RotateEvent is logged in the binary log indicating possible log rotation i.e. MySQL server closes the current binary log and opens the new one. Possible scenarios for log rotations are:

1. Size of the log file is exceeding 'max_binlog_size' parameter.

2. From MySQL command console, explicit 'flush logs' command has been issued.

In either of those cases, MySQL create a Rotate event in the current binary log, closes the current binary log then it opens a new binary log for further processing. Rotate event contains new log file to be created. MySQL VAM uses this value to close the existing binary log file and open the new binary log file and continue its reading. Rotate event is represented by CRotateEvent C++ class, defined as follows

```
class CRotateEvent: public CLogEvent
{
public:
    const char* m_newLogFile;   /* name of the new log
                                   file name */
    uint m_newLogRFileLen;
    ...
}
```

StopEvent

MySQL server logs StopEvent in the binary class when explicit shutdown of the MySQL server. Subsequent start of the MySQL server creates a new binary log file. StopEvent does not contain any entries for new binary log file.

Event Order

Figure 11:
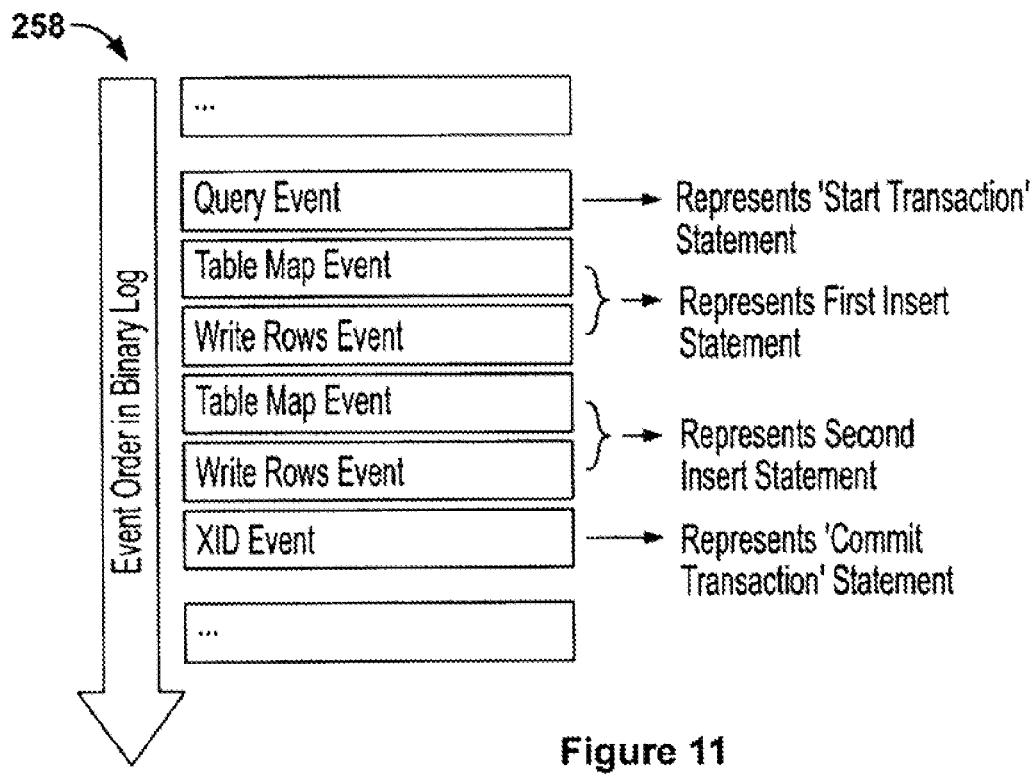
FIG. 11 illustrates an example of an event order, in accordance with an embodiment.

FIG. 11 shows an Event Order 258 example in accordance with an embodiment. This section illustrates event order in the binary log for different scenarios. See Section titled "Event Order" for various transaction scenarios. By way of example, the following statements can been stored in the binary log file as:

```
start transaction;
insert into t2 values (10,'Sample10');
insert into t3 values (20,'Sample20', NOW( ));
commit;
```

Figure 12:
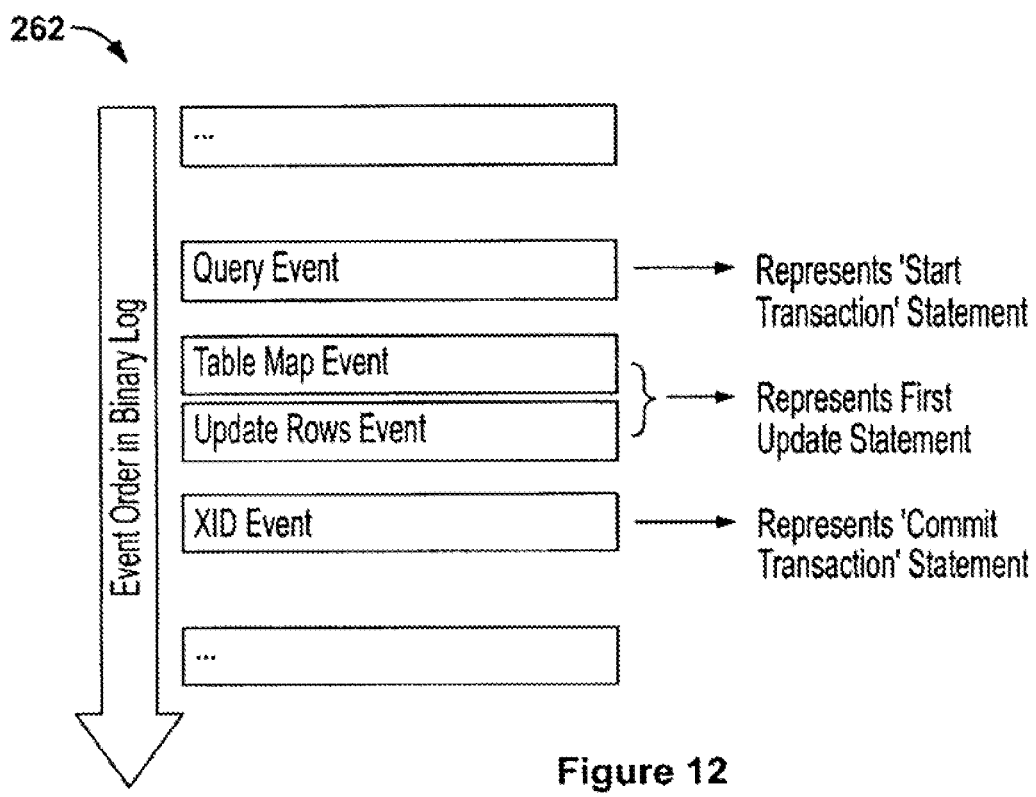
FIG. 12 illustrates another example of an event order, in accordance with an embodiment.

FIG. 12 shows another Event Order 262 example in accordance with an embodiment. By way of another example, the following statements are stored in the binary log file as:

```
start transaction;
update t1 set a=50 where a=10;
savepoint Sv1;
insert into t1 values (30,'Sample30');
rollback to Sv1;
commit;
```

Data Types

This section describes the various supported data types and storage requirements inside the binary log. MySQL supports a number of data types in several categories: numeric types, date and time types, and string (character) types. Each type is stored within the log records as a set of bytes. The number of bytes used depends on the data type, whether the column is nullable, and the length of the field. Variable length character fields (such as VARCHAR, VARBINARY, CHAR, TEXT and BLOB etc) are preceded by its length.

The data types CHAR, VARCHAR and TEXT can be stored in ucs2 (maximum of 2 bytes per character) format or utf8 format (either 2 or 3 bytes per character). For example, a VARCHAR(255) column can hold a string with a maximum length of 255 characters. Assuming that the column uses the latin1 character set (one byte per character), the actual storage required is the length of the string, plus one byte to record the length of the string. For the string 'abcd', L is 4 and the storage requirement is five bytes. If the same column is instead declared to use the ucs2 double-byte character set, the storage requirement is 10 bytes: The length of 'abcd' is eight bytes and the column requires two bytes to store lengths because the maximum length is greater than 255 (up to 510 bytes).

In accordance with an embodiment, LOB fields are stored inline. LOB fields are preceded by its length. Supported data types and their log size are described in Table 5.

TABLE 5

| MySQL Data Type | MySQL Internal Data Type | Log Size* |
|---|---|---|
| String Data Types | | |
| CHAR(M) | MYSQL_DTYPE_STRING | M × w bytes, 0 <= M <= 255, where w is the number of bytes required for the maximum-length character in the character set |
| BINARY(M) | MYSQL_DTYPE_STRING | M bytes, 0 <= M <= 255 |
| VARCHAR(M), VARBINARY(M) | MYSQL_DTYPE_VARCHAR | L + 1 bytes if column values require 0-255 bytes, L + 2 bytes if values may require more than 255 bytes |
| ENUM('value1', 'Value 2', . . . ) | MYSQL_DTYPE_STRING | 1 or 2 bytes, depending on the number of enumeration values (65,535 values maximum) |
| SET('value1', 'Value2', . . . ) | MYSQL_DTYPE_STRING | 1, 2, 3, 4, or 8 bytes, depending on the number of set members (64 members maximum) |
| LOB Data Types | | |
| TINYBLOB, TINYTEXT | MYSQL_DTYPE_BLOB | L + 1 bytes, where L < $2^8$ |
| BLOB, TEXT | MYSQL_DTYPE_BLOB | L + 2 bytes, where L < $2^{16}$ |
| MEDIUMBLOB, MEDIUMTEXT | MYSQL_DTYPE_BLOB | L + 3 bytes, where L < $2^{24}$ |
| LONGBLOB, LONGTEXT | MYSQL_DTYPE_BLOB | L + 4 bytes, where L < $2^{32}$ |
| Numeric Data Types | | |
| TINYINT | MYSQL_DTYPE_TINYINT | 1 byte |
| SMALLINT | MYSQL_DTYPE_SHORT | 2 byte |
| MEDIUMINT | MYSQL_DTYPE_INT24 | 3 bytes |
| INT, INTEGER | MYSQL_DTYPE_LONG | 4 bytes |
| BIGINT | MYSQL_DTYPE_LONGLONG | 8 bytes |
| FLOAT(p) | MYSQL_DTYPE_FLOAT | 4 bytes if 0 <= p <= 24, 8 bytes if 25 <= p <= 53 |
| FLOAT | MYSQL_DTYPE_FLOAT | 4 bytes |
| DOUBLE [PRECISION], REAL | MYSQL_DTYPE_DOUBLE | 8 bytes |
| DECIMAL(M, D), NUMERIC(M, D) | MYSQL_DTYPE_NEWDECIMAL | Values for DECIMAL columns are represented using a binary format that packs nine decimal (base 10) digits into four bytes. Storage for the integer and fractional parts of each value are determined separately. Each multiple of nine digits requires four bytes, and the "leftover" digits require some fraction of four bytes. The storage required for excess digits is given by the following table:<br><br>Leftover Digits / No. of Bytes<br>0 / 0<br>1 / 1<br>2 / 1<br>3 / 2<br>4 / 2<br>5 / 3 |

TABLE 5-continued

| MySQL Data Type | MySQL Internal Data Type | Log Size* |
|---|---|---|
| | | 6   3 |
| | | 7   4 |
| | | 8   4 |
| BIT(M) | MYSQL_DTYPE_BIT | (M + 7)/8 bytes |
| Date and Time Data Types | | |
| DATE | MYSQL_DTYPE_NEWDATE | 3 bytes |
| TIME | MYSQL_DTYPE_TIME | 3 bytes |
| DATETIME | MYSQL_DTYPE_DATETIME | 8 bytes |
| TIMESTAMP | MYSQL_DTYPE_TIMESTAMP | 4 bytes |
| YEAR | MYSQL_DTYPE_YEAR | 1 byte |

Handling NULL Values

In accordance with an embodiment, binary log row event (i.e WriteRowsEvent, UpdateRowsEvent and DeleteRowsEvent) does not store NULL column values along with other non NULL column values. NULL column values are stored as set of NULL bytes before the data section. Total number of NULL bytes usually is (number of columns+7)/8. Please refer to WriteRowsEvent (todo) for more information.

NULL columns are stored in these NULL bytes section as little endian orders. The flag for the first column from the left is in the least-significant bit of the first byte, the second is in the second least significant bit of the first byte, the ninth is in the least significant bit of the second byte, and so on. Each bit in the NULL byte can be masked to find out if the column is holding NULL value or not. Following piece of code checks if the column is NULL or not:

```
unsigned int null_byte=*data_ptr;        /* read the NULL byte
                                            value */
unsigned int null_mask= 1U;
for(int i=0;i<ncols;i++)
{
    if ((null_mask & 0xFF) == 0)
    {
        null_mask= 1U;                   /* reset the NULL mask */
        null_byte= *data_ptr++;          /* move to reading next NULL
                                            byte */
    }
    if (null_byte & null_mask)           /*check if the field is NULL*/
    {
        printf("Column [%d]: Value: NULL \n", i+1);
        null_mask <<= 1;
        continue;                        /* skip processing the data */
    }
    null_mask <<= 1;
    --- Do processing of non NULL field values
}
```

Empty strings are stored in binary log as zero length value.

Data Type Conversion

In accordance with an embodiment, CHAR, BINARY, VARCHAR and VARBINARY Types—String data types are variable in length. Actual data values are preceded by data length. Also the value for the length could require either 1 byte (if the length is less than 255) or 2 bytes (if the length is more than 255).

As described above, 'fieldmetadata' of a string column (applies to CHAR, VARCHAR, BINARY and VARBINARY types) helps to find out maximum value of the length. Based on this value, actual length can be retrieved as follows:

```
/* column_max_datasize value is set using preceding tablemapevent's
fieldmetadata value
*/
int actual_data_len;
 If(column_max_datasize) > 255
{
    /* get the actual data lenth */
    actual_data_len = (int) (*data_ptr);
    /* now jump to the data section */
    data_ptr ++;
}
else
{
    actual_data_len = uint2korr(data_ptr);
    /* now jump to the data section */
    data_ptr +=2;
}
/* move to the next column value */
data_ptr+=actual_data_len;
uint2korr( ) function is a MySQL provided macro defined in
config_win.h. This function reads first two bytes of a given
pointer and returns the corresponding integer value.
```

ENUM Type

In accordance with an embodiment, ENUM columns are stored as index value in the log file. For example, for column defined as ENUM ('red,''orange','blue') can have index value of 0,1 and 2. So storing ENUM value of 'orange' will result in index value 2 in the binary log file. Maximum enumeration index value supported is 65,535 bytes.

'fieldmetadata' of ENUM column type contains maximum bytes required for ENUM index value. Based on this value, actual length can be retrieved as follows

```
/* column_max_datasize value is set using preceding tablemapevent's
fieldmetadata value
*/
int enum_index_value;
 if(column_max_datasize == 1)       /* for ENUM index values
                                       which are less than 255 */
{
enum_index_value = (int) (*data_ptr);
}
else                                /* for ENUM index values more than 255 */
{
    enum_index_value = uint2korr(data_ptr);
}
```

SET Type

In accordance with an embodiment, SET column is a string column that can have zero or more values, each of which must be chosen from a list of allowed values specified when the table is created. For example, a column specified as SET('one', 'two') can have any of these values: 'one'; 'two'; 'one,two'. A SET can have a maximum of 64 different members. Set columns are stored as binary value in the log file. For example, a column specified as SET('a','b','c','d'), the members have the following decimal and binary values:

TABLE 6

| SET Member | Decimal Value | Binary Value |
|---|---|---|
| 'a' | 1 | 0001 |
| 'b' | 2 | 0010 |
| 'c' | 4 | 0100 |
| 'd' | 8 | 1000 |

So storing a SET('a','b') can result in decimal value of 3 (i.e. binary value of 0011). Since SET column can have a maximum of 64 different members, so the maximum bytes required to store those values could go as much as 8 bytes. 'fieldmetadata' of SET column type contains maximum bytes required for SET decimal value. Based on this value, actual length can be retrieved as follows:

```
/* column_max_datasize value is set using preceding tablemapevent's
fieldmetadata value
*/
longlong set_decimal_value;
if (column_max_datasize == 1)
set_decimal_value=(int)*data_ptr;
else if (col_max_datasize == 2)
    set_decimal_value = uint2korr(data_ptr);
else if (col_max_datasize == 3)
    set_decimal_datavalue = uint3korr(data_ptr);
else if (col_max_datasize == 4)
    set_decimal_value = uint4korr(data_ptr);
else if (col_max_datasize == 8)
    set_decimal_value = uint8korr(data_ptr);
```

Integer Type

In accordance with an embodiment, Integer values are stored as signed as well as unsigned integers in the binary logs. Integers will be read as signed integer and send to extract by MySQL VAM. The C type of the integer depends on the size of the integer column, which can be determined by the length. For the MySQL has C types defined for all integer variants based on the size, and associated macros to copy memory locations to integer values that are platform independent. Table 7 shows the type to use for each length and the associated macro:

TABLE 7

| MYSQL TYPE | Byte Length | C Type | Macro |
|---|---|---|---|
| TINYINT | 1 | int8 | Direct assignment: i1 val = *data_ptr |
| SMALLINT | 2 | int16 | sint2korr(data_ptr) |
| MEDIUMINT | 3 | int24 | sint3korr(data_ptr) |
| INT, INTEGER | 4 | int32 | sint4korr(data_ptr) |
| BIGINT | 8 | int64 | sint8korr(data_ptr) |

The integer value can be returned to the GoldenGate MYSQL VAM as an integer of the specified size, so the data conversion simply needs to use the appropriate macro, and return the converted integer and the length as the integer data.

Float, Double and Decimal Types

In accordance with an embodiment, for floating-point data types, MySQL uses four bytes for single-precision values and eight bytes for double-precision values. MySQL allows a non-standard syntax: FLOAT(M,D) or DOUBLE (M,D). Here, "(M,D)" means than values can be stored with up to M digits in total, of which D digits may be after the decimal point. For the MySQL has macros for float and double column types to copy memory locations to float or double values that are platform independent. Table 8 shows the type to use for each length and the associated macro:

TABLE 8

| MYSQL TYPE | Byte Length | C Type | Macro |
|---|---|---|---|
| FLOAT | 4 | Float | Float4get(data_ptr) |
| DOUBLE | 8 | double | Float8get(data_ptr) or doubleget(data_ptr) |

The float and double value can be returned to the GoldenGate MYSQL VAM as a float of the specified size, so the data conversion simply needs to use the appropriate macro, and return the converted float and the length as the float data.

The DECIMAL (or NUMERIC) data types are used to store exact numeric data values. These types are used to store values for which it is important to preserve exact precision, for example with monetary data. Prior to the releases of MySQL (earlier than 5.0.3), DECIMAL and NUMERIC values are stored in string format.

Values for DECIMAL columns are represented using a binary format that packs nine decimal (base 10) digits into four bytes. Storage for the integer and fractional parts of each value are determined separately. Each multiple of nine digits requires four bytes, and the "leftover" digits require some fraction of four bytes. The storage required for excess digits is given by Table 9:

TABLE 9

| Leftover Digits | No of Bytes |
|---|---|
| 0 | 0 |
| 1 | 1 |
| 2 | 1 |
| 3 | 2 |
| 4 | 2 |
| 5 | 3 |
| 6 | 3 |
| 7 | 4 |
| 8 | 4 |

MySQL provides functions for decimal column type that can copy memory locations containing decimal values and convert them into string values. MySQL VAM uses 'bin2decimal' function to read the memory location and fill this value into 'decimal_t' structure. Another function 'decimal_bin_size' simply converts this 'decimal_t' structure and return the value as string. This is explained in the following lines of code.

```
/* from fieldmetada (table_map_event), retrieve precision and scale value for the decimal
columns*/
precision = *field_metadata;
scale = *(field_metadata+1);
/* retrieve decimal value from the row data (from rows_log_event)*/
```

-continued

```
char decimal_string_buf[200];        /* buffer that holds decimal value in string form*/
int decimal_string_len = sizeof(decimal_string_buf) - 1;
decimal_digit_t dec_buf[DECIMAL_MAX_PRECISION];
decimal_t dec;
dec.len= precision;
dec.buf= dec_buf;
bin2decimal((uchar *)data_ptr, &dec, precision, scale);    /*convert to 'decimal_t'
structure*/ int size = decimal_bin_size(precision, scale);       /*get the total byte size*/
decimal2string(&dec, decimal_string_buf, &decimal_string_len, 0, 0, 0); /*convert to
string*/
decimal_string_buf[decimal_string_len]= 0;
printf("Column [%d]: Type: MYSQL_TYPE_NEWDECIMAL Value: %s\n",
                                i+1, decimal_string_buf);
data_ptr+=size;              /* jumps to next column value*/
```

The decimal value can be returned to the GoldenGate MYSQL VAM as a string, so the data conversion simply needs to use the appropriate macro, and return the converted decimal value.

BIT Type

In accordance with an embodiment, BIT type column stores up to 64 bits per value. Maximum storage required is (M+7)18 bytes, where 'M' indicates number of bits per value. MYSQL VAM retrieves BIT column value from binary log using the following code

```
/* from fieldmetada (table_map_events), retrieve maximum byte storage
required for BIT columns*/
col_max_datasize = *field_metadata;
/* retrieve decimal value from the row data (from rows_log_event)*/
longlong val;
switch (col_max_datasize)
{
    case 1: val =(ulonglong)ptr[0]; break;
    case 2: val =(ulonglong)mi_uint2korr(ptr);break;
    case 3: val =(ulonglong)mi_uint3korr(ptr);break;
    case 4: val =(ulonglong)mi_uint4korr(ptr);break;
    case 5: val =(ulonglong)mi_uint5korr(ptr);break;
    case 6: val =(ulonglong)mi_uint6korr(ptr);break;
    case 7: val =(ulonglong)mi_uint7korr(ptr);break;
    default: val= (ulonglong) mi_uint8korr(ptr + col_max_size -
        sizeof(longlong)); break;
}
printf("Column [%d]: Type: MYSQL_TYPE_SET Binary Value is:
%d\n", i+1, val);
ptr+=col_max_datasize; /* move to next data section */
```

DATE, TIME, YEAR, DATETIME and TIMESTAMP Types

Date and Time type conversion is the most complex of all data conversions. Compared other data types, MySQL does not exposes MACROS or public functions for handling Date and Time types. MySQL internal implementations were debugged to find out the proper way to handle those calls. MySQL VAM has rewritten its own version of code based on the MySQL internal implementation. MYSQL VAM retrieves binary data from the log and converts them into common structure MySQL_TIME (this structure is defined and used by MySQL). Later those structures can be transformed to string before handing over to extract.

```
MYSQL_TIME is defined as
typedef struct st_mysql_time
{
    unsigned int year, month, day, hour, minute, second;
    unsigned long second_part;
    my_bool       neg;
    enum enum_mysql_timestamp_type time_type;
} MYSQL_TIME;
```

DATE types are stored in packed three-byte integer form as DD+MM×32+YYYY×16×32. The supported range is '1000-01-01' to '9999-12-31'. DATE columns are retrieved from binary log using following code

```
MYSQL_TIME tm;
uint32 tmp=(uint32) uint3korr(data_ptr); /* retrieve 3 byte DATE value*/
tm.day= tmp & 31;
tm.month= (tmp >> 5) & 15;
tm.year= (tmp >> 9);
printf("Column [%d]: Type: MYSQL_TYPE_NEWDATE Value:
%02d-%02d-%02d \n", i+1,
                                  tm.year,tm.month,tm.day);
data_ptr+=3;          /* move to next data section
```

TIME types are stored in packed three-byte integer as DD×24×3600+HH×3600+MM×60+SS. TIME columns are retrieved from binary log using following code

```
MYSQL_TIME tm;
uint32 tmp=(uint32) uint3korr(data_ptr); /* retrieve 3 byte DATE value*/
tm.hour= (int) (tmp/10000);
tmp-=tm.hour*10000;
tm.minute= (int) tmp/100;
tm.second= (int) tmp % 100;
tm.second_part=0;
printf("Column [%d]: Type: MYSQL_TYPE_TIME Value:
%dHr:%dMin:%dSec \n", i+1,
tm.hour,
tm.minute, tm.second);
data_ptr+=3;          /* move to next data section
```

YEAR types are stored in 1 byte integer. Values can be 'YYYY' (with the value range of 1901 to 2155) or 'YY' (value range of 70 (1970) to 69 (2069)) format. YEAR column values are retrieved from binary log using the following code

```
int year_val= *data_ptr;       /* retrieve 1 byte year value */
year_val+=1900;                /* add to 1900 to get actual value */
printf("Column [%d]: Type: MYSQL_TYPE_YEAR Value: %d\n",
i+1, year_val);
data_ptr+=1;                  /* move to next data section
```

The DATETIME type is used when values are needed that contain both date and time information. The supported range is '1000-01-01 00:00:00' to '9999-12-31 23:59:59'. DATETIME types are stored as 8 byte integer containing a four-byte integer packed as YYYY×10000+MM×100+DD; a four-byte integer packed as HH×10000+MM×100+SS. DATETIME column values are retrieved form binary log using following code:

```
MYSQL_TIME tm;
uint32 part1,part2;
longlong val= (longlong)uint8korr(data_ptr);
part1=(uint32) (val/LL(1000000));
part2=(uint32) (val – (ulonglong) part1*LL(1000000));
tm.neg=       0;
tm.second_part=0;
tm.second= (int) (part2%100);
tm.minute= (int) (part2/100%100);
tm.hour= (int) (part2/10000);
tm.day=      (int) (part1%100);
tm.month= (int) (part1/100%100);
tm.year= (int) (part1/10000);
printf("Column [%d]: Type: MYSQL_TYPE_DATETIME Value: %02d-%02d-%02d
%02d:%02d:%02d \n", i+1,
                     tm.year,tm.month,tm.day,tm.hour,tm.minute,tm.second);
data_ptr+=8; /*move to next data section */
```

TIMESTAMP type is of four-byte integer representing seconds UTC since the epoch (ranges from '1970-01-01 00:00:01' UTC to '2038-01-09 03:14:07' UTC). TIMESTAMP column values are retrieved form binary log using following code

```
struct tm tmp_tm;
MYSQL_TIME tm;
time_t tmp_t= (time_t)uint4korr(data_ptr);   /* read the binary
                                                 log data */
localtime_r(&tmp_t, &tmp_tm);                /* get the local
                                                 time value */
localtime_to_TIME(&tm, &tmp_tm);             /* adjust this with
                                                 MYSQL_TIME
                                                 structure*/
printf("Column [%d]: Type: MYSQL_TYPE_TIMESTAMP Value:
    %02d-%02d-%02d %02d:%02d:%02d \n", i+1,
         tm.year, tm.month, tm.day, tm.hour,tm.minute, tm.second);
data_ptr+=4;        /*move to next data section */
locatime_r( ) and localtime_to_TIME( ) are MySQL supplied functions.
```

LOB Data Types

In accordance with an embodiment, MySQL LOB-MySQL stores LOB records (Large Objects—namely TINYBLOB, BLOB, MEDIUM BLOB, LONG BLOB and TEXT types) inline with other column values. BLOB or TEXT column data are stored in similar way as VARBINARY or VARCHAR fields. I.e. the first few bytes stores the length followed by original LOB value. For LOB columns, 'field metadata' of Table Map Events contains maximum byte storage required for a given LOB field. This value comes handy when allocating memory needed to retrieve LOB values. The Maximum size for TINYTEXT and TINYBLOB columns is 255. This is similar to handling CHAR and BINARY columns.

The Maximum size for TEXT and BLOB columns is 64 k. This is similar to handling VARCHAR and VARBINARY columns. Values stored in TINYTEXT, TEXT, TINYBLOB and BLOB columns can be sent to extract in one single shot. For other LOB types, data can be read in one chunk at a time of 64 k in size and send to extract. Following lines of code explains handling of MYSQL LOB columns.

```
/* from fieldmetada (table_map_events), retrieve maximum byte storage
required for LOB columns*/
col_max_datasize = *field_metadata;
/* retrieve decimal value from the row data (from rows_log_event)*/
longlong lob_size;
switch (col_max_datasize)
{
    case 1: lob_size =(ulonglong)data_ptr[0]; break;
    case 2: lob_size =(ulonglong)uint2korr(data_ptr);break;
```

-continued

```
    case 3: lob_size =(ulonglong)uint4korr(data_ptr);break;
    case 4: lob_size =(ulonglong)uint8korr(data_ptr);break;
}
/* now point to the data section */
data_ptr+=col_max_datasize;
if (lob_size < GG_MAX_CHUNK_SIZE)
{
        /* send the LOB data in one single chunk to extract */
}
else
{
        /* send the LOB data in multiple chunks to extract */
}
data_ptr+=lob_size; /*move to the next column value */
```

For other LOB types such as MEDIUM BLOB and LONG BLOB (which can hold more than 64 k bytes of data), data can be read in one chunk at a time of 32 k in size and send to extract in multiple calls. As described above, LOB column values are stored in line with other non LOB column values. This is different from other databases since the values are not stored inline as well as accessed using locator or coupon where the data can be fetched on demand. This is not the case for MySQL database (with the storage engine MyISAM as well as InnoDB). For reading LOB column value from the binary log, MySQL internal IO_CACHE class fetches entire value of this LOB column from the log file to the memory. i.e., memory is allocated completely in one shot for this LOB column by this class.

In accordance with an embodiment, the MYSQL VAM API specification outlines that LOB data of bigger sizes should be sent to MYSQL VAM API in chunks. But in MySQL case, the data is already fetched completely in memory by MySQL internal classes (i.e memory is allocated completely by the IO_CACHE object), LOB data can be sent to MYSQL VAM API in one call as well as multiple call in chunk size of 32 k bytes.

Working with Binary Logs

As described above in accordance with an embodiment, MySQL uses binary log index file to maintain the list containing current binary log file as well as older log files. This index file is present in the same directory location as binary log. This allows the system to read from the configuration file to find out the log file format, for example in ROW, STATEMENT, or MIXED format and abend if it is not ROW.

When a MySQL server creates a new binary log file (during startup or by explicit 'flush logs' command), it writes BINLOG_MAGIC value (4 bytes) and 'Format description event'. This Format description is written only once for given binary log.

'flag' attribute of this Format description event tracks if the current binary log is in use by the server. MySQL server sets this status to LOG_EVENT_BINLOG_IN_USE_F value during the start up and clears this value during shutdown or log rotation. This can be treated as reliable indicator to check if binary log is closed properly or not.

During initialization, MySQL VAM needs to obtain the name of the active binary log file. MySQL VAM uses following steps to obtain the name of active binary log. The same procedure is used by MySQL server to obtain the current binary log:

1. Get the MySQL installation home, either from environment variable or supplied MYSQL VAM parameter
2. Read MySQL initialization file—my.ini in windows platform or my.conf in other platform.
3. Obtain the value of 'log-bin' parameter. Find out log directory location as well as log index file name from this value.
4. Opens the log index file name and read the content. From this content, find out the last log file in the list.
5. Open this log file and check if the log file is still in use by the server (checking Format description event's flag value to LOG_EVENT_BINLOG_IN_USE_F). If yes, then MySQL server is using this log file currently for writing. MySQL VAM treats this log file as active log file.

Positioning Binary Log

In accordance with an embodiment, MYSQL VAM API can request MySQL VAM to position either by timestamp value or sequence number. In extract, positioning can be requested by either ADD or ALTER commands in GGSCI. In addition to support positioning by timestamp and sequence number in MYSQL VAM, the system supports positioning to end as well as begin of active binary log.

Positioning by Sequence Number

In accordance with an embodiment, when sending transaction record to extract, MySQL VAM also sends sequence number value to extract. During the restart scenario, extract send this last received sequence number value to MySQL VAM during MYSQL VAMInitialize( ) call. MySQL VAM uses this value to set the correct read position.

MySQL VAM send this sequence number value as ASCII string using GG_ATTR_DS_SEQID. MySQL VAM creates this ASCII string as combination of current log file and current event position (i.e log.000001:10045) before sending this value to extract.

To position by sequence number during MYSQL VAMInitialize( ) call, MySQL VAM parses the sequence number value from extract, and get the log file name as event position. Then it opens the corresponding log file and start scanning for events. If the event's position matches with the one specified in the sequence number, MySQL VAM set this position as current read position and start reading the binary log content from this position.

Positioning by Timestamp Value

In order, to position by timestamp, the system must find a begin transaction record in the active binary log (i.e QueryEvent containing 'BEGIN' string) with timestamp equal to or greater than the required timestamp value. If the timestamp value is a time in the future, the system can keep reading at the end of log, until it sees a Begin Transaction record with a timestamp equal or greater than required timestamp position. There are two scenarios that could occur in or with the binary log:

Scenario 1: Begin/End transaction record exists in the active binary log and first such record's timestamp is less than required timestamp position. In this scenario, MySQL VAM will scan the active binary log file to find a begin transaction record whose timestamp value is greater than or equal to required timestamp position. If MySQL VAM could not find the required record, it will be positioned at the end of log.

Scenario 2: First Begin/End Transaction record in the active binary log has a timestamp value that is greater than or equal to required timestamp position. This scenario can become tricky. In this scenario, it is possible that older binary logs may also have begin transaction records with timestamps equal to the required timestamp value.

In accordance with an embodiment, the MySQL VAM scans the binary log starting with the latest to oldest. (Order is maintained in the log index file). If MySQL VAM do not find a begin/end transaction record with timestamp equal to required the timestamp, then MySQL VAM either return an error or position at the beginning of the oldest log file. Positioning by timestamp could be time consuming process since MySQL VAM might need to open older log files and searches for an event entry matches with that time stamp.

Positioning to the End of Log

In accordance with an embodiment, to position to end of active binary log, MySQL VAM will use my_b_seek( ) function to request IO_CACHE class to seek to the end of the log.

Positioning to Begin of Log

In accordance with an embodiment, to position to beginning of transaction log, MySQL VAM will call my_b_seek( )function to position beginning of the log at the location after BINLOG_MAGIC plus global format description event data.

Reading Binary Log

In accordance with an embodiment, MySQL VAM uses MySQL's IO_CACHE C++ class and file utility functions to open and read MySQL binary logs. MySQL IO_CACHE C++ class (part of mysql_client.lib) reads content of the binary log in chunks of 64 k in size. This buffered read helps the reduced IO usage.

In order to find out the correct sequence of reading binary log files, various internal modules of MySQL such as 'mysqlbinlog' utility and 'replication slave thread' module were debugged. Following lines of code initializes the IO_CACHE class and open and read a binary log file.

```
/* opens the logfile name using MYSQL's my_open utility */
((fd = my_open(logname, O_RDONLY | O_BINARY,
MYF(MY_WME))) < 0)
    return 1;
/* Initialize the IO_CACHE object so that it can start reading the
events */
if (init_io_cache(file, fd, 0, READ_CACHE,
start_position_mot, 0,
        MYF(MY_WME | MY_NABP)))
{
    my_close(fd, MYF(MY_WME));
    return 1;
}
/* check the BINLOG_MAGIC and version of the binary log file */
check_header(file, &glob_description_event);
/* start reading the events*/
for (;;)
{
    my_off_t old_off = my_b_tell(file);
    void *tmpbuf = NULL;
    /* read one event at a time from binary log*/
    Log_event* ev = Log_event::read_log_event(file,
    glob_description_event);
    /* no event. check if eof is reached*/
    if (!ev)
```

```
{
    /* check if the binary log is active. If yes, comeback and
    re read again */
    if (glob_description_event->getFlags( ) &
    LOG_EVENT_BINLOG_IN_USE_F)
}
    else
        break;
        continue;
        /* now process the event */
        error = processevent(ev);
}
my_close(fd, MYF(MY_WME));
end_io_cache(file);
```

Log Rotation

In accordance with an embodiment, the following scenario causes MySQL's log rotation (i.e. closing existing active log file and open the new log file)

1. When active log file size exceeds the value of 'max_binlog_size' (specified in my.ini or my.conf)
   a. MySQL logs 'Rotate Event' in the active binary log. Rotate Event data section contain location and name of the new active binary log file.
   b. MySQL closes active binary log and reset the Format description event flag to NULL.(this flag was set previously with LOG_EVENT_BINLOG_IN_USE_F value)
   c. MySQL creates a new binary log and set the Format description event flag to LOG_EVENT_BINLOG_IN_USE_F value.
2. When explicit 'flush logs' command is issued in the MySQL SQL prompt.
   a. MySQL logs 'Rotate Event' in the active binary log. Rotate Event data section contain location and name of the new active binary log file.
   b. MySQL closes active log and reset the Format description event flag to NULL.(this flag was set previously with LOG_EVENT_BINLOG_IN_USE_F value)
   c. MySQL creates a new binary log and set the Format description event flag to LOG_EVENT_BINLOG_IN_USE_F value.
3. During server shutdown
   a. MySQL logs 'Stop Event' in the active binary log
   b. MySQL closes the binary log. Also resets the format description event's flag to NULL value.(this flag was set previously with LOG_EVENT_BINLOG_IN_USE_F value)
4. During the server startup
   a. MySQL creates a new binary log and set the Format description event flag to LOG_EVENT_BINLOG_IN_USE_F value.

As described above, in accordance with an embodiment, MySQL VAM uses Rotate Event identify the occurrence of log rotation and uses the Rotate Event's data to get the next binary log name. MySQL VAM opens the next binary log and continuous its binary log reading. In order to handle scenario 3 and 4, when MySQL VAM encounters Stop Event, it closes the binary log that it uses and checks the log index file for the presence of next binary log. If MySQL VAM finds a next binary log in the index file, it opens the binary log and continuous its reading. If MySQL VAM could not find any new log file name in the index file (server is still in the shutdown mode, never started after the shutdown), MySQL VAM informs extract to abend.

There is one more interesting scenario to consider. During server crash, there is a small chance that flag of the Format description event is not going to be reset by the server during the server restart. Also MySQL server neither logs the Rotate Event nor logs the Stop Event in the active binary log file. So the subsequent startup, server creates new binary log file with out resetting flag in the previous binary log. So in this unique situation, two binary logs having LOG_EVENT_BINLOG_IN_USE_F status flag set. MySQL VAM might encounters this scenario under following conditions:

1. MySQL VAM is currently processing active binary log. Server crash happens at the time of reading. It is advisable to stop the extract, do the crash recovery and restart the MYSQL VAM after the server startup.

2. MySQL VAM is positioned to read older log file. While reading from one file to another file (i.e log rotation), it encounters a log file flag with the value of LOG_EVENT_BINLOG_IN_USE_F. Also note that this log file is not the latest log file (i.e not an active binary log). When EOF is occurred, MySQL VAM could check the log index file for the existence of next log file. In this case, MySQL VAM assumes that server crash was happened previously and close the exiting log file and open the next log file and do the continues log reading.

MYSQL VAM Class Design

As described above, in accordance with an embodiment, the MYSQL VAM implementation is written using C++; wherein implementation of the MYSQL VAM module is split into 2 major parts. The first part reads the binary log events using internally developed event C++ classes, process them in to data records, make the records in readymade format (ready to send) and store it into limited size Queue. The Second part fetches the records from Queue and sends it to API whenever it has got request from API.

Binary Log Reader

Figure 13A:
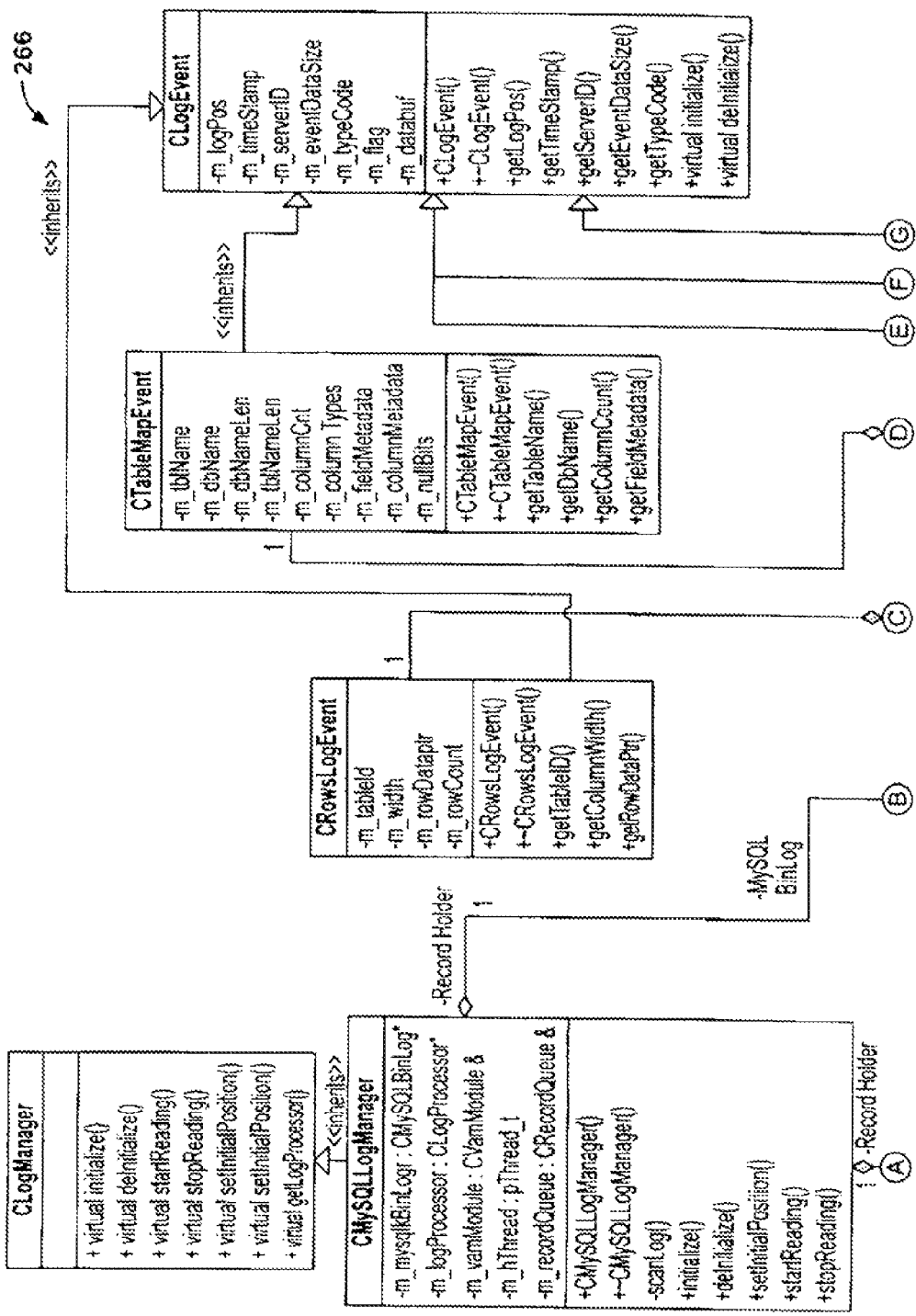
FIGS. 13A-13C illustrate an example of a class diagram for the VAM binary log reader, in accordance with an embodiment.
Figure 13B:
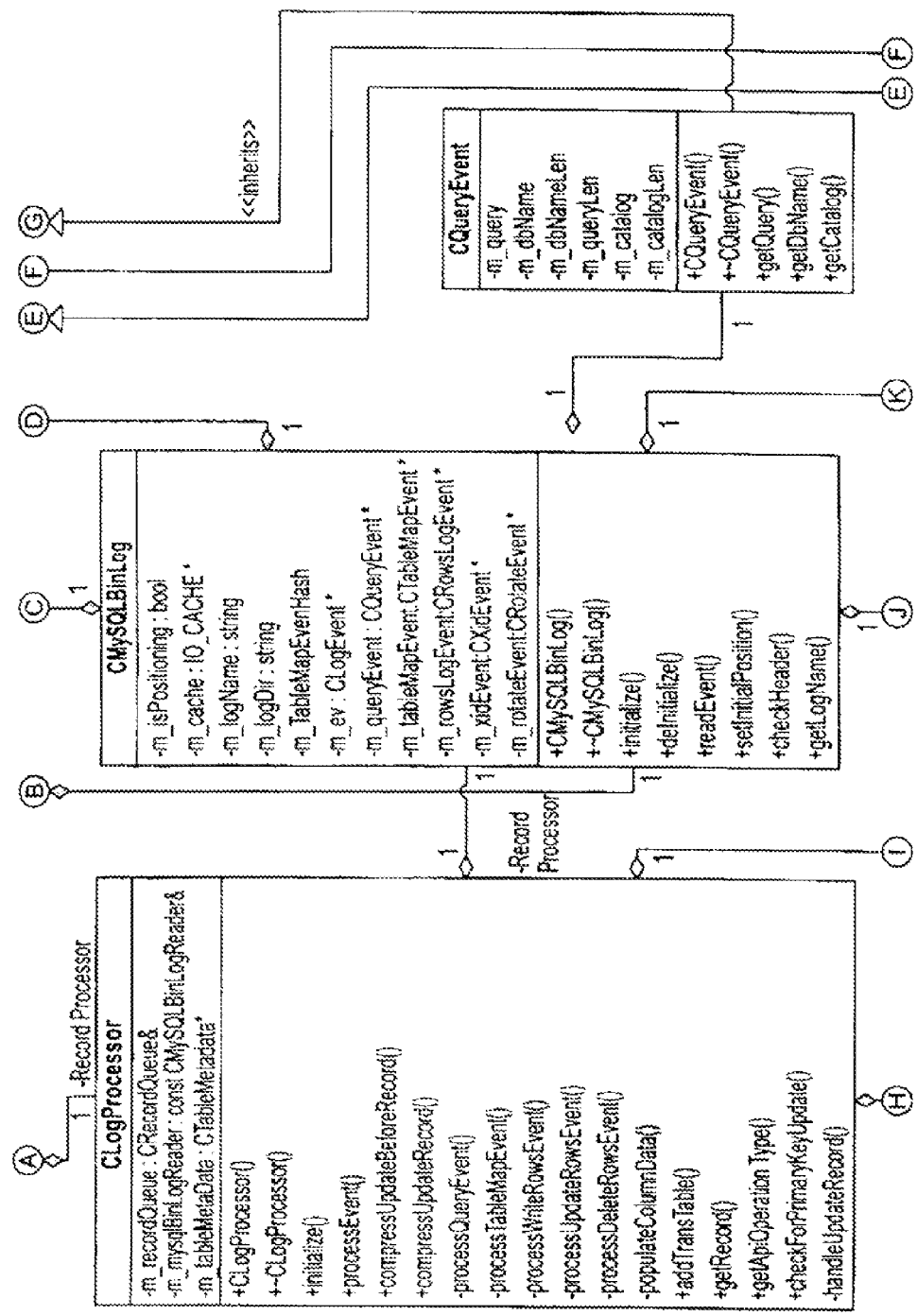
Figure 13C:
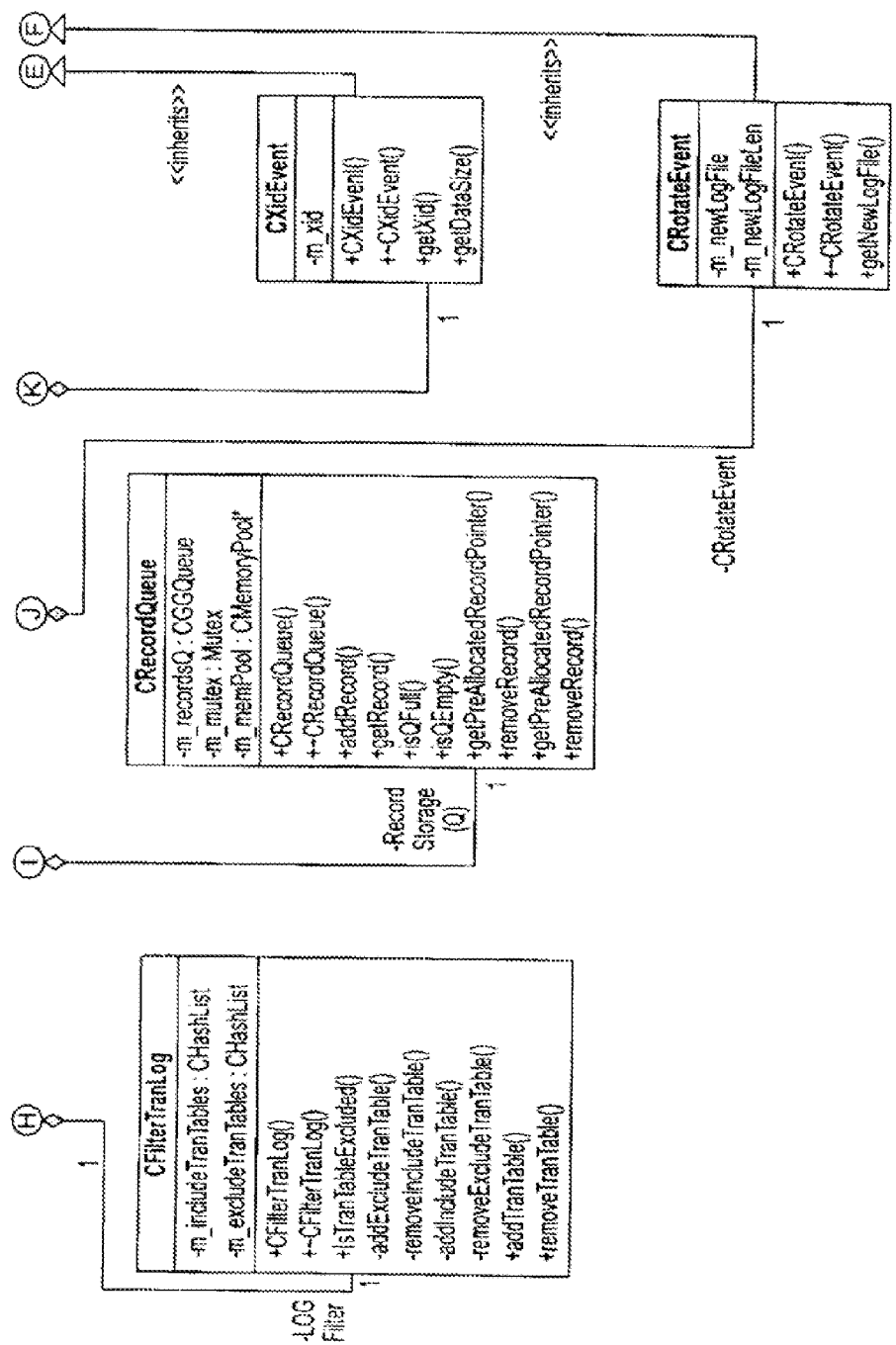

FIGS. 13A-13C shows a Class Diagram for the VAM Binary Log Reader 266 in accordance with an embodiment. CMySQLBinLogManager class is the main control class, which manage the complete process and delegates the tasks to different classes. It is mainly responsible for reading data from the binary log, process the binary log data (converts MySQL events to data record) and put the record (readymade) into the limited size Queue. It is derived from CLogManager class, which has all the functions as "pure virtual".

The design has CMySQLBinLogReader class, which is responsible for fetching data from binary log, it uses various C++ event classes and MySQL's IO_CACHE classes to manage the lifecycles of binary log as wells event instances. It also uses CFilterBinLog to filter the events.

CLogProcessor class is going to process binary log data and it fills the limited size Queue (CRecordQueue) with prepared readymade object. Later on these objects would be fetched by some other class to send it to API.

CRecordQueue class is responsible for storage of readymade records (CRecord).

From the top, the process would start from the scanLog function of CMySQLBinLogManager class, it is separate execution entity (thread), which runs independently and it is responsible for complete process execution. It first asks for binary log reading to CMySQLBinLogReader and it gets the raw event instance from it. It passes this record to CLogProcessor to process it further and put into limited size Queue.

Binary Log Processor

Figure 14A:
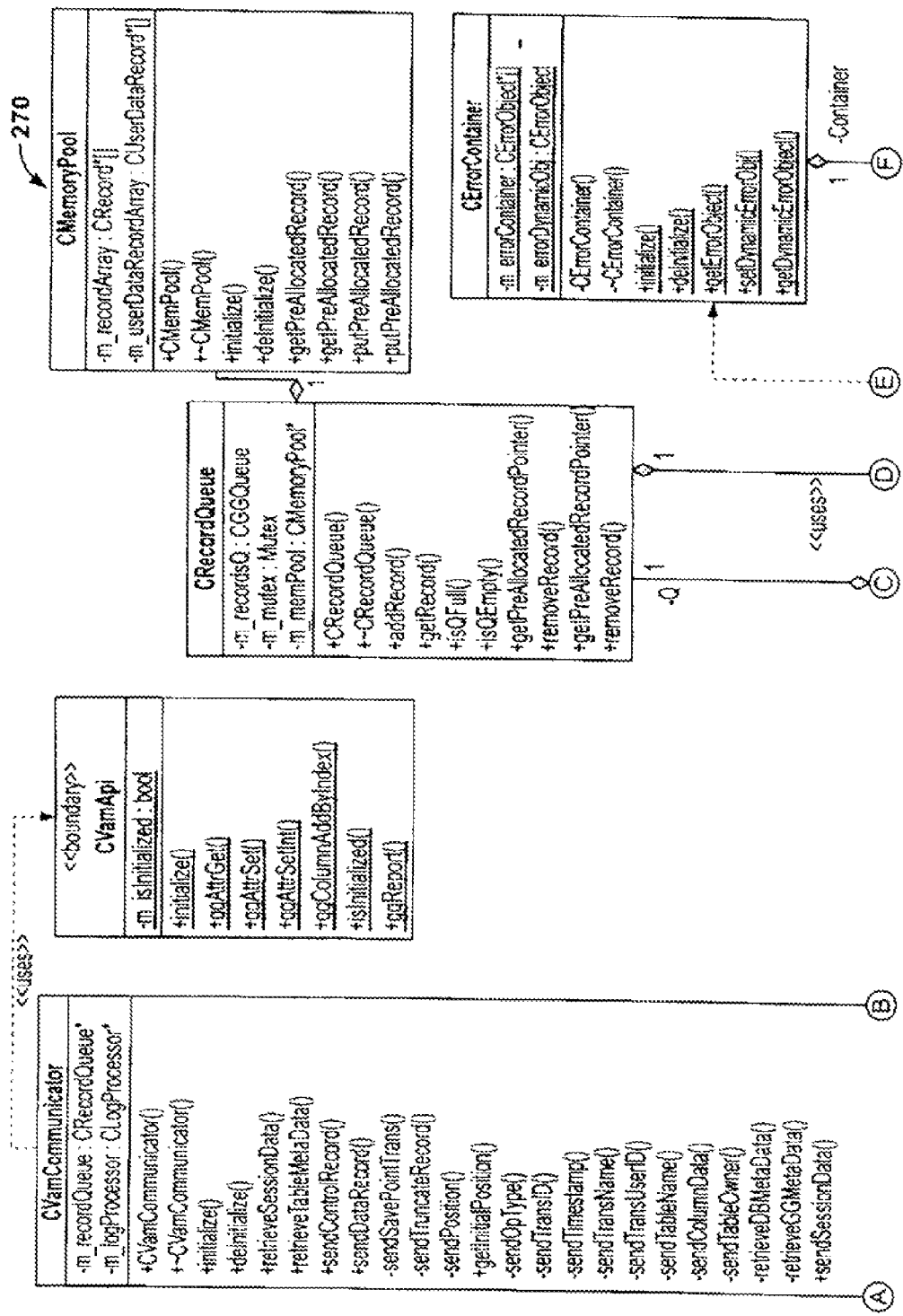
FIGS. 14A-14C illustrate an example of shows a class diagram for the VAM binary log processor, in accordance with an embodiment.
Figure 14B:
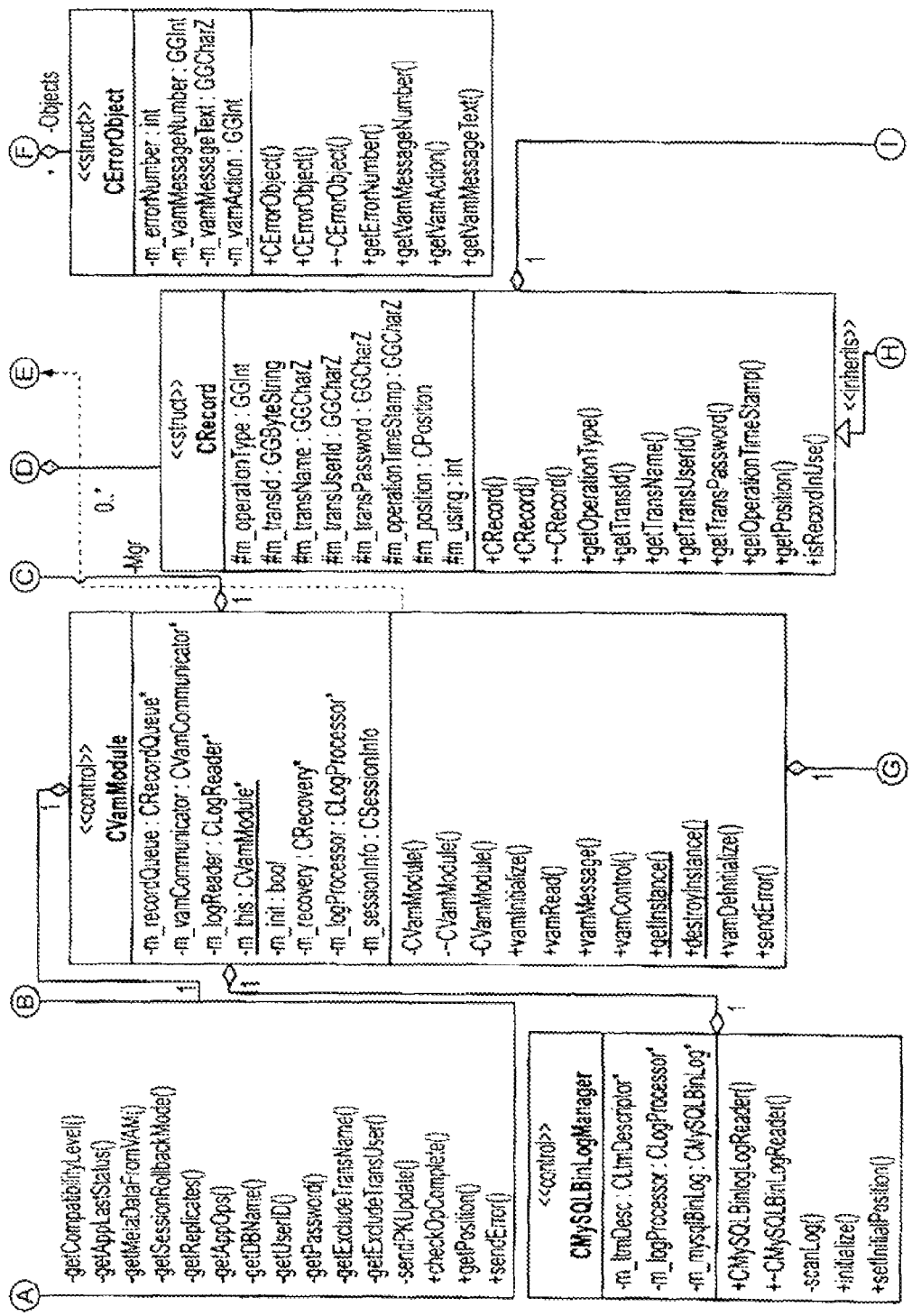
Figure 14C:
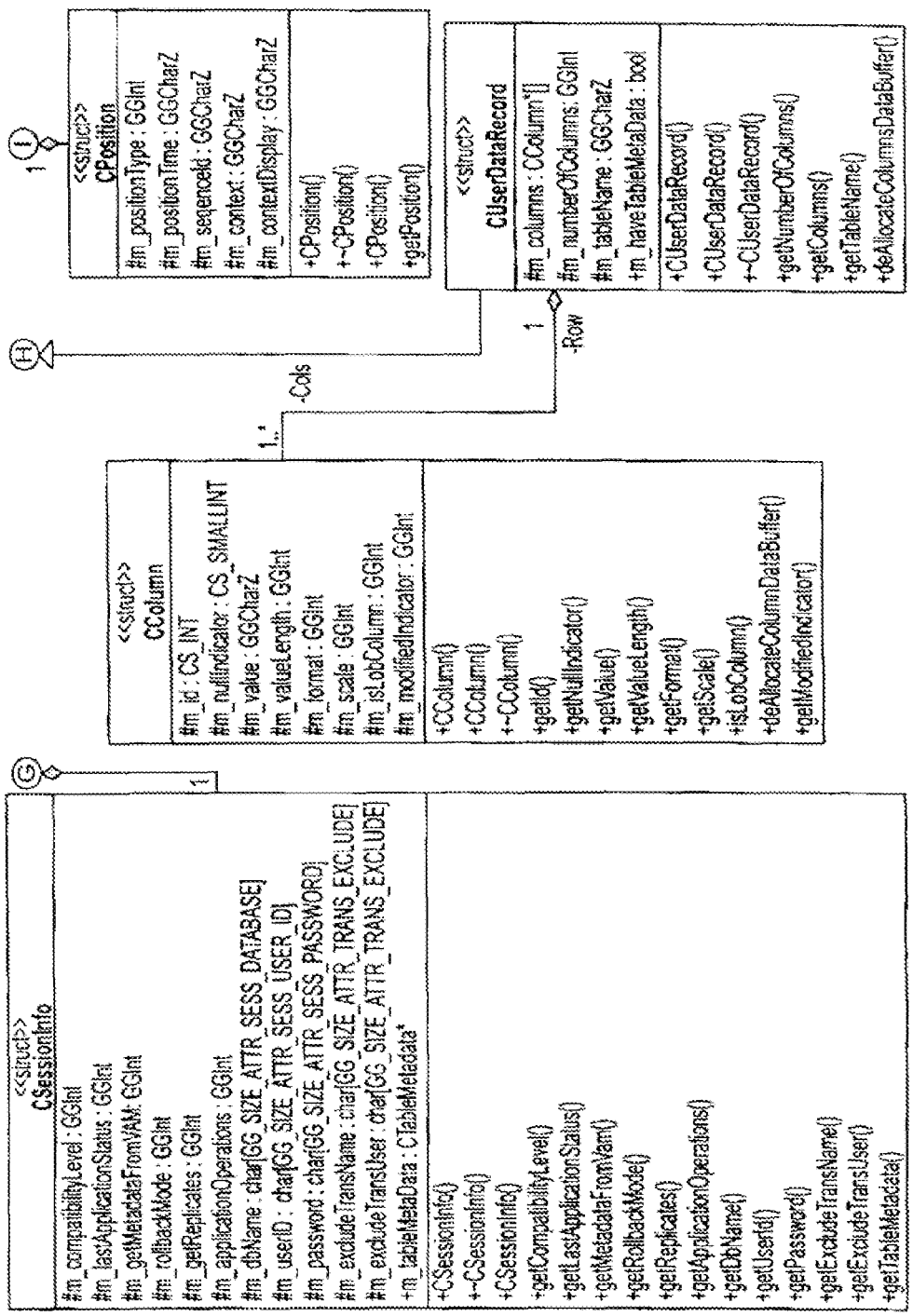

FIG. 14 shows a Class Diagram for a Binary Log Processor 270 in accordance with an embodiment.

CMySQL VAMModule is the main control class for complete MYSQL VAM Module; it is a singleton class, which has only 1 object throughout the life of MYSQL VAM Module. It has all the core business logic inside in it, and it delegates the tasks across various classes.

MySQL VAM Module has published 4 functions to API that are MYSQL VAMInitialize, MYSQL VAMRead, MYSQL VAMMessage and MYSQL VAMControl. Business logic of these functions is residing in CMySQL VAMModule class. It fetches CRecord (ready made record put into Queue by design's first part) from CRecordQueue and sends it to API through CMySQL VAMCommunicator class.

CMySQL VAMCommunicator class will be responsible for how to send and get data from/to API; it shall use CMySQL VAMApi class to use published functions from API. CMySQL VAMApi class is wrapper around API published functions.

CErrorContainer class shall store error object in it and would used to handle the error prone scenarios.

Whenever MYSQL VAM published functions (i.e. MYSQL VAMInitialize) called from API, the flow would be directed to CMySQL VAMModule class and it will redirect flow to some other class and would return the data to API. For example if MYSQL VAMRead has been called from API, CMySQL VAMModule's MySQL VAMRead will be called and it would fetch the data from CRecordQueue and send it to API through CMySQL VAMCommunicator class.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. In particular, while the embodiments described illustrate the use of a MySQL environment, and a MySQL VAM, it will be evident that other types of VAM can be implemented with other types of database or system. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for data replication between a source database and a target database, comprising:
a computer including a micro-processor;
a source database having data stored therein, and one or more binary logs associated therewith which record event data describing changes made to the data during a transaction at the source database;
a replication module running on the computer and including a plurality of reader and processor classes, each class executing on a dedicated thread, to replicate the changes made to the data at the source database, for use with a target database, by
reading, from the one or more binary logs, the event data describing the changes made to the data during the transaction,
processing the event data to determine events describing one or more full or partial data changes at the source database, and
storing records into a record queue of a particular size, wherein the records reflect the determined events;
wherein, upon a subsequent request to replicate data to the target database, the system invokes a plurality of record classes to retrieve the records stored in the record queue to create a trail file, wherein the trail file is then communicated to the target database and used therein to replicate the changes made to the data, from the source database to the target database.

2. The system of claim 1, wherein all of the event data are statements that operate to modify data in the source database.

3. The system of claim 1, wherein the replication module is configured to receive event data that represent modifications to the source database only.

4. The system of claim 1, further comprising one or more libraries that access the source database.

5. The system of claim 4, wherein the replication module includes one or more binary log classes that wrap around the libraries.

6. The system of claim 1, wherein the replication module is configured to read event data from one or more additional binary log files.

7. The system of claim 1, wherein the source database includes transactional tables, and updates to the transactional tables are cached until committed.

8. The system of claim 1, wherein the source database includes non-transaction tables, and updates to the non-transaction tables are received into the binary log file when executed.

9. A method that uses log-based replication to transfer data between a source database and a target database, comprising:
providing a replication module including a plurality of reader and processor classes on a computing device, wherein the computing device includes a processor and a source database having data stored therein, and one or more binary logs associated therewith which record event data describing changes made to the data during a transaction at the source database;
using the plurality of reader and processor classes, each class executing on a dedicated thread, to replicate, the changes made to the data at the source database, for use with a target database, including
reading, from the one or more binary logs, the event data describing the changes made to the data during the transaction, processing the event data to determine events describing one or more full or partial data changes at the source database, and storing records into a record queue of a particular size, wherein the records reflect the determined events; and invoking a plurality of record classes to retrieve the records stored in the record queue to create a trail file, upon a subsequent request to replicate data to the target database, wherein the trail file is then communicated to the target database and used therein to replicate the changes made to the data, from the source database to the target database.

10. The method of claim 9, wherein all of the event data are statements that operate to modify data in the source database.

11. The method of claim 9, wherein the replication module is configured to receive event data that represent modifications to the source database only.

12. The method of claim 9, wherein one or more libraries access the source database.

13. The method of claim 12, wherein the replication module includes one or more binary log classes that wrap around the libraries.

14. The method of claim 9, wherein the replication module is configured to read event data from one or more additional binary log files.

15. The method of claim 9, wherein the source database includes transactional tables, and updates to the transactional tables are cached until committed.

16. The method of claim 9, wherein the source database includes non-transaction tables, and updates to the non-transaction tables are received into the binary log file when executed.

17. A non-transitory computer readable storage medium, including instructions stored thereon, wherein the instructions, when read and executed by a computer, cause the computer to perform the steps comprising:

providing a replication module including a plurality of reader and processor classes on a computing device, wherein the computing device includes a processor and a source database having data stored therein, and one or more binary logs associated therewith which record event data describing changes made to the data during a transaction at the source database;

using the plurality of reader and processor classes, each class executing on a dedicated thread, to replicate, the changes made to the data at the source database, for use with a target database, including reading, from the one or more binary logs, the event data describing the changes made to the data during the transaction, processing the event data to determine events describing one or more full or partial data changes at the source database, and storing records into a record queue of a particular size, wherein the records reflect the determined events; and invoking a plurality of record classes to retrieve the records stored in the record queue to create a trail file, upon a subsequent request to replicate data to the target database, wherein the trail file is then communicated to the target database and used therein to replicate the changes made to the data, from the source database to the target database.

18. The non-transitory computer readable storage medium of claim 17, wherein all of the event data are statements that operate to modify data in the source database.

19. The non-transitory computer readable storage medium of claim 17, wherein the replication module is configured to receive event data that represent modifications to the source database only.

20. The non-transitory computer readable storage medium of claim 17, wherein one or more libraries access the source database.

* * * * *